US011862876B2

(12) United States Patent
Kim et al.

(10) Patent No.: US 11,862,876 B2
(45) Date of Patent: Jan. 2, 2024

(54) ANTENNA AND ELECTRONIC DEVICE INCLUDING THE SAME

(71) Applicant: Samsung Electronics Co., Ltd., Suwon-si (KR)

(72) Inventors: Dongyeon Kim, Suwon-si (KR); Hosaeng Kim, Suwon-si (KR); Seongjin Park, Suwon-si (KR); Sumin Yun, Suwon-si (KR); Myunghun Jeong, Suwon-si (KR); Jehun Jong, Suwon-si (KR); Jaehoon Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 103 days.

(21) Appl. No.: 17/014,471

(22) Filed: Sep. 8, 2020

(65) Prior Publication Data

US 2021/0075115 A1 Mar. 11, 2021

(30) Foreign Application Priority Data

Sep. 6, 2019 (KR) ........................ 10-2019-0110473

(51) Int. Cl.
*H01Q 9/04* (2006.01)
*H01Q 3/22* (2006.01)
*H01Q 1/24* (2006.01)

(52) U.S. Cl.
CPC ........... *H01Q 9/0485* (2013.01); *H01Q 1/243* (2013.01); *H01Q 3/22* (2013.01); *H01Q 9/0407* (2013.01)

(58) Field of Classification Search
CPC ........ H01Q 9/0485; H01Q 1/243; H01Q 3/22; H01Q 9/0407; H01Q 3/36; H01Q 9/26;
(Continued)

(56) References Cited

U.S. PATENT DOCUMENTS 4,835,538 A * 5/1989 McKenna ............ H01Q 9/0414
343/700 MS
9,583,817 B2 * 2/2017 Watanabe .............. H01Q 1/243
(Continued)

FOREIGN PATENT DOCUMENTS

JP 2001-345634 A 12/2001
JP 2006-080609 A 3/2006
(Continued)

OTHER PUBLICATIONS

International Search Report dated Dec. 15, 2020, issued in International Patent Application No. PCT/KR2020/012017.
(Continued)

*Primary Examiner* — Hai V Tran
*Assistant Examiner* — Bamidele A Immanuel
(74) *Attorney, Agent, or Firm* — Jefferson IP Law, LLP

(57) ABSTRACT

An electronic device is provided. The device includes a housing including a first cover having a first dielectric constant, and an antenna structure disposed in an inner space of the housing. The antenna structure may include a PCB, an antenna element disposed in the PCB to form a beam pattern in a specific direction, a first dielectric structure disposed on a radiation path of the beam pattern, formed integrally with or combined with the PCB, and having a second dielectric constant equal to or different from the first dielectric constant, and a second dielectric structure disposed on the radiation path between the first dielectric structure and the first cover, and having a third dielectric constant higher than the first dielectric constant and the second dielectric constant. The electronic device may further include a wireless communication circuit configured to transmit and/or receive a radio signal through the antenna element.

20 Claims, 34 Drawing Sheets

(58) Field of Classification Search
CPC ...... H01Q 15/006; H01Q 21/08; H01Q 21/28; H01Q 1/38; H04B 1/3827; H04M 1/0266
See application file for complete search history.

(56) References Cited

U.S. PATENT DOCUMENTS 10,084,241 B1 * 9/2018 Jenwatanavet .......... H01Q 1/48
10,361,488 B1 * 7/2019 Ng .......................... H01Q 13/28
2004/0066346 A1 * 4/2004 Huor .................... H01Q 21/064 343/770
2009/0096679 A1 * 4/2009 Harokopus .......... H01Q 9/0464 343/700 MS
2010/0321253 A1 * 12/2010 Ayala Vazquez ...... H01Q 13/18 343/702
2012/0206302 A1 * 8/2012 Ramachandran ........ H01Q 1/22 343/866
2012/0212890 A1 * 8/2012 Hoshino ............. H04M 1/0266 361/679.01
2012/0309473 A1 * 12/2012 Choo .................... G06F 1/1656 455/575.1
2012/0313834 A1 * 12/2012 Eom ........................ H01Q 7/00 343/700 MS
2013/0169486 A1 * 7/2013 Huang ..................... H01Q 1/38 343/700 MS
2013/0169499 A1 * 7/2013 Lin ...................... H01Q 21/205 343/776
2013/0222613 A1 * 8/2013 Yehezkely ............... H01Q 1/44 348/207.1
2013/0278468 A1 * 10/2013 Yehezkely ........... H01Q 1/2266 343/702
2014/0184450 A1 * 7/2014 Koo ..................... H01Q 1/2266 343/702
2014/0218253 A1 8/2014 Puzella et al.
2015/0102965 A1 * 4/2015 Irci .......................... H01Q 1/42 343/702
2015/0116169 A1 * 4/2015 Ying ...................... H01Q 1/243 343/729
2015/0249283 A1 * 9/2015 Watanabe ............. H01Q 1/243 343/702
2016/0164155 A1 * 6/2016 Wang ...................... H01P 1/182 216/13
2016/0218417 A1 * 7/2016 Konanur .............. H01Q 1/2266
2016/0276734 A1 * 9/2016 Jin ....................... H01Q 1/2283
2016/0308563 A1 * 10/2016 Ouyang ............... H01Q 25/005
2017/0110787 A1 * 4/2017 Ouyang ................... H01Q 1/42
2017/0201011 A1 * 7/2017 Khripkov ................. H01Q 1/42
2017/0294705 A1 * 10/2017 Khripkov ................. H01Q 1/38
2018/0138589 A1 * 5/2018 Clegg ....................... B32B 5/18
2018/0366812 A1 * 12/2018 Kim ....................... H01Q 1/243
2019/0027802 A1 * 1/2019 Noori ................... H01Q 21/065
2019/0051989 A1 * 2/2019 Kim ....................... H01Q 19/22
2019/0123448 A1 * 4/2019 Taraschi ............. H01Q 21/0087
2019/0165470 A1 5/2019 Jeon
2019/0165473 A1 * 5/2019 Yun ........................ H01Q 1/243
2019/0181536 A1 * 6/2019 Chen .................... H01Q 1/2283
2019/0257933 A1 * 8/2019 Nath ....................... G01S 13/08
2019/0267718 A1 * 8/2019 Rajagopalan .......... H01Q 1/523

FOREIGN PATENT DOCUMENTS

JP 2007-067596 A 3/2007
KR 10-2011-0028144 A 3/2011

OTHER PUBLICATIONS

Patrovsy et al., "Dielectric Slab Mode Antenna for Integrated Millimeter-wave Transceiver Front-ends", Dec. 31, 2013.
Wu, "The Substrate Integrated Circuits—A New Concept for High-Frequency Electronics and Optoelectronics", Fellow, IEEE, Dominic Deslandes, and Yves Cassivi, Dec. 31, 2003.
Ju et al., "Novel vertical transition using a trough line, a slab line and shielded multilayer coplanar waveguides for 50 GHz LTCC hermetic SMT MMIC package", Nov. 31, 2007.
Korean Office Action dated Aug. 3, 2023, issued in Korean Patent Application No. 10-2019-0110473.

* cited by examiner

XY plane : Spread Fields

XY plane : Confined Fields

YZ plane : Beam Splitting

YZ plane : Beam Focusing

ANTENNA AND ELECTRONIC DEVICE INCLUDING THE SAME

CROSS-REFERENCE TO RELATED APPLICATION(S)

This application is based on and claims priority under 35 U.S.C. § 119(a) of a Korean patent application number 10-2019-0110473, filed on Sep. 6, 2019, in the Korean Intellectual Property Office, the disclosures of which is incorporated by reference herein its entirety.

BACKGROUND

1. Field

The disclosure relates to an antenna and an electronic device including the same. More particularly, the disclosure relates to an antenna having improved radiation performance using a dielectric structure, and an electronic device including the same.

2. Description of Related Art

With the development of wireless communication technology, electronic devices such as smart phones are widely used in everyday life, and thus the use of contents is increasing exponentially. Due to the rapid increase in the use of contents, the network capacity is gradually reaching the limit, and after the commercialization of 4th generation (4G) communication systems, next-generation communication systems (e.g., a 5th generation (5G) communication system, a pre-5G communication system, or a new radio (NR) communication system) using a super-high frequency (e.g., mmWave) band (e.g., 3 GHz to 300 GHz band) is now studied in order to satisfy the increasing demands of radio data traffic.

Next-generation wireless communication technologies are currently developed to permit signal transmission/reception using frequencies in the range of 3 GHz to 100 GHz, overcome a high free space loss due to frequency characteristics, implement an efficient mounting structure for increasing an antenna gain, and realize a related new antenna structure. This antenna structure may include an array-type antenna module in which at least one antenna element (e.g., at least one conductive pattern and/or at least one conductive patches) are arranged at regular intervals. These antenna elements may be disposed in an electronic device so as to form a beam pattern in one direction.

The electronic device may include a lateral member (or a lateral surface) including at least in part a conductive portion to reinforce the rigidity and create a beautiful appearance. In addition, the electronic device may include an electrical structure, such as a volume/power key button or a laser direct structuring (LDS) antenna, disposed near the lateral member in an inner space thereof. The conductive lateral member and/or the electrical structure may cause distortion and/or reflection of a signal radiated from the antenna structure, thereby lowering the antenna gain and reducing the beam coverage.

Further, in order to avoid the interference of the electrical structure, the antenna structure may not be located at the outermost side in the inner space of the electronic device, but be disposed in an inward direction. Due to this arrangement position of the antenna structure (e.g., a dipole antenna), as the frequency increases, a main beam of a radiation pattern may be split, and thus the antenna gain (or directivity) may be deteriorated.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an antenna and an electronic device including the same.

Another aspect of the disclosure is to provide an antenna having improved radiation performance using a dielectric structure, and an electronic device including the same.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a first cover having a first dielectric constant, and an antenna structure disposed in an inner space of the housing. The antenna structure may include a printed circuit board (PCB), at least one antenna element disposed in the PCB to form a beam pattern in a specific direction, a first dielectric structure disposed on a radiation path of the beam pattern, formed integrally with or combined with the PCB, and having a second dielectric constant equal to or different from the first dielectric constant, and a second dielectric structure disposed on the radiation path between the first dielectric structure and the first cover, and having a third dielectric constant higher than the first dielectric constant and the second dielectric constant. The electronic device may further include a wireless communication circuit configured to transmit and/or receive a radio signal through the at least one antenna element.

In accordance with another aspect of the disclosure, an electronic device is provided. The device includes a housing and an antenna structure disposed in an inner space of the housing. The antenna structure may include a printed circuit board (PCB), at least one antenna element disposed in the PCB to form a beam pattern in a specific direction, and a dielectric structure disposed on a radiation path of the beam pattern, formed integrally with or combined with the PCB, and having a first dielectric constant, wherein the dielectric structure includes a first area corresponding to the radiation path, and a low-dielectric structure disposed on both sides of the first area and having a second dielectric constant lower than the first dielectric constant. The electronic device may further include a wireless communication circuit configured to transmit and/or receive a radio signal through the at least one antenna element.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following detailed description, taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
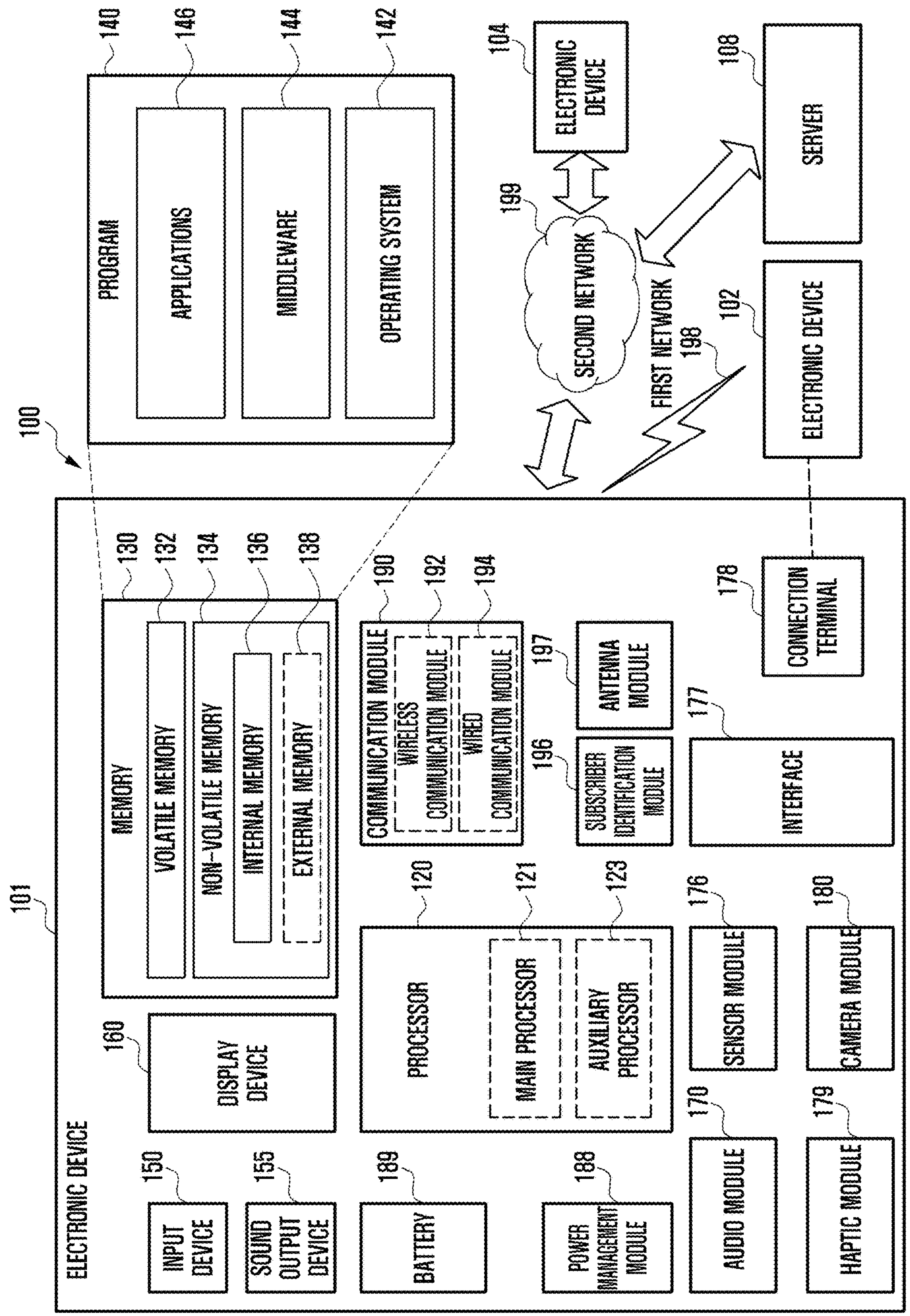
FIG. 1 is a block diagram illustrating an electronic device in a network environment according to an embodiment of the disclosure.

FIG. 1 illustrates an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture an image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to an embodiment may be one of various types of electronic devices. The electronic device may include a portable communication device (e.g., a smart phone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment.

With regard to the description of the drawings, similar reference numerals may be used to refer to similar or related elements.

A singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases.

As used herein, such terms as "1st" and "2nd", or "first" and "second" may be used to simply distinguish a corresponding component from another, and does not limit the components in other aspect (e.g., importance or order). If an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked.

The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
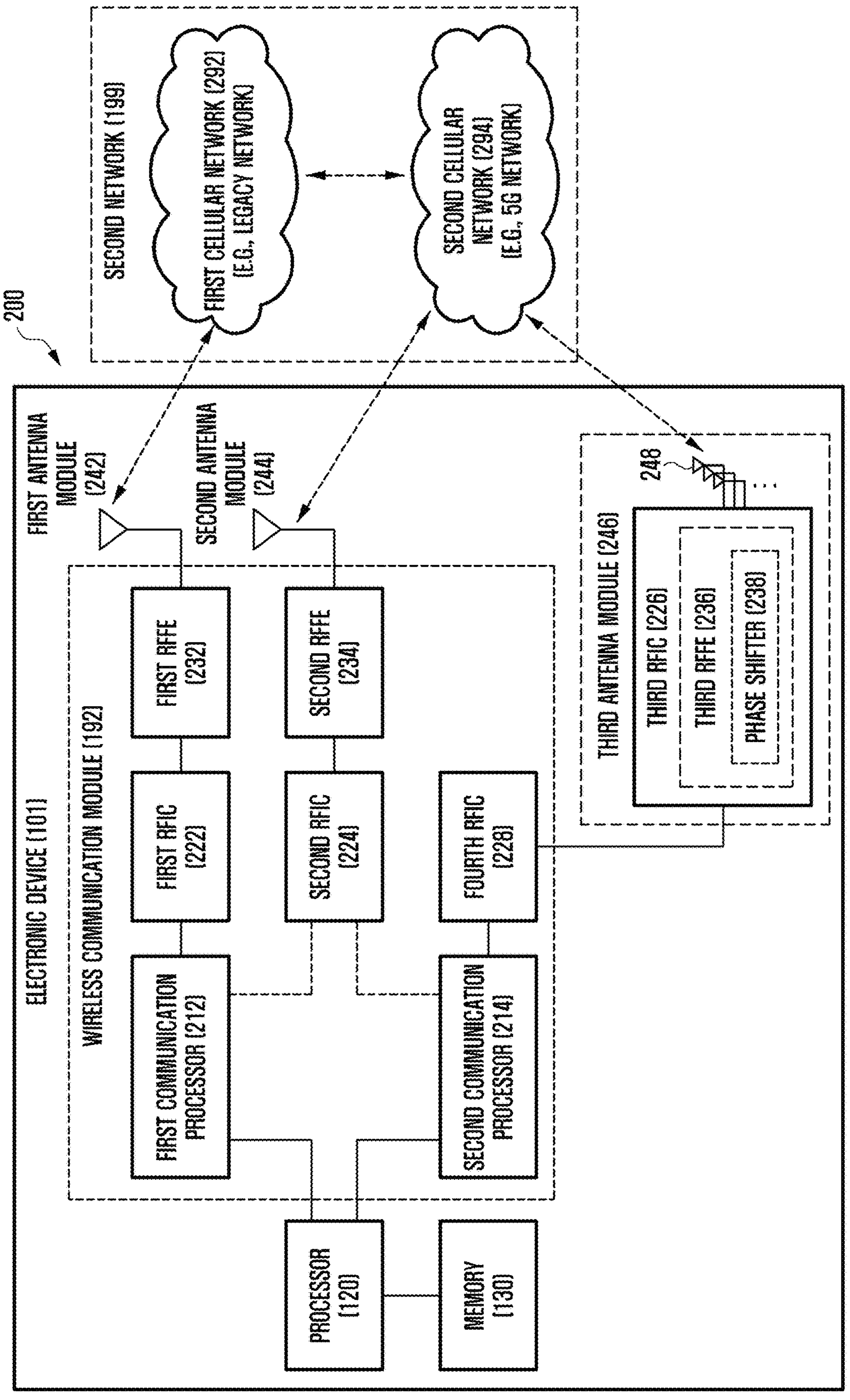
FIG. 2 is a block diagram illustrating an electronic device for supporting a legacy network communication and a 5G network communication according to an embodiment of the disclosure.

FIG. 2 is a block diagram illustrating an electronic device in a network environment including a plurality of cellular networks according to an embodiment of the disclosure.

Referring to FIG. 2, the electronic device 101 may include a first communication processor 212, second communication processor 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to another embodiment, the electronic device 101 may further include at least one of the components described with reference to FIG. 1, and the second network 199 may further include at least one other network. According to one embodiment, the first communication processor 212, second communication processor 214, first RFIC 222, second RFIC 224, fourth RFIC 228, first RFFE 232, and second RFFE 234 may form at least part of the wireless communication module 192. According to another embodiment, the fourth RFIC 228 may be omitted or included as part of the third RFIC 226.

The first communication processor 212 may establish a communication channel of a band to be used for wireless communication with the first cellular network 292 and support legacy network communication through the established communication channel According to various embodiments, the first cellular network may be a legacy network including a second generation (2G), 3G, 4G, or long term evolution (LTE) network. The second communication processor 214 may establish a communication channel corresponding to a designated band (e.g., about 6 GHz to about 60 GHz) of bands to be used for wireless communication with the second cellular network 294, and support 5G network communication through the established communication channel According to various embodiments, the second cellular network 294 may be a 5G network defined in 3GPP. Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel According to one embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to one embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to one embodiment, the first RFIC 222 and the second RFIC 224 may be implemented into at least part of a single package or a single chip. According to one embodiment, the first RFFE 232 and the second RFFE 234 may be implemented into at least part of a single package or a single chip. According to one embodiment, at least one of the first antenna module 242 or the second antenna module 244 may be omitted or may be combined with another antenna module to process RF signals of a corresponding plurality of bands.

According to one embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to one embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3A:
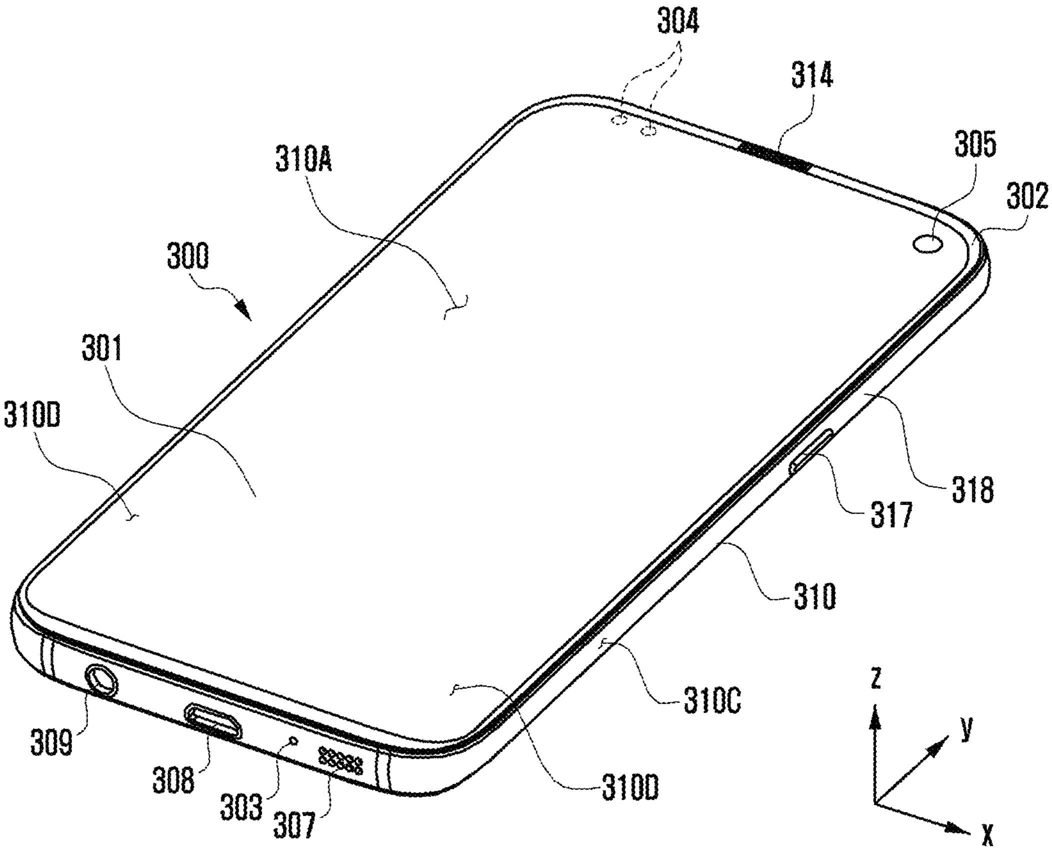
FIG. 3A is a perspective view illustrating a front surface of a mobile electronic device according to an embodiment of the disclosure.

FIG. 3A illustrates a perspective view showing a front surface of a mobile electronic device according to an embodiment of the disclosure.

Figure 3B:
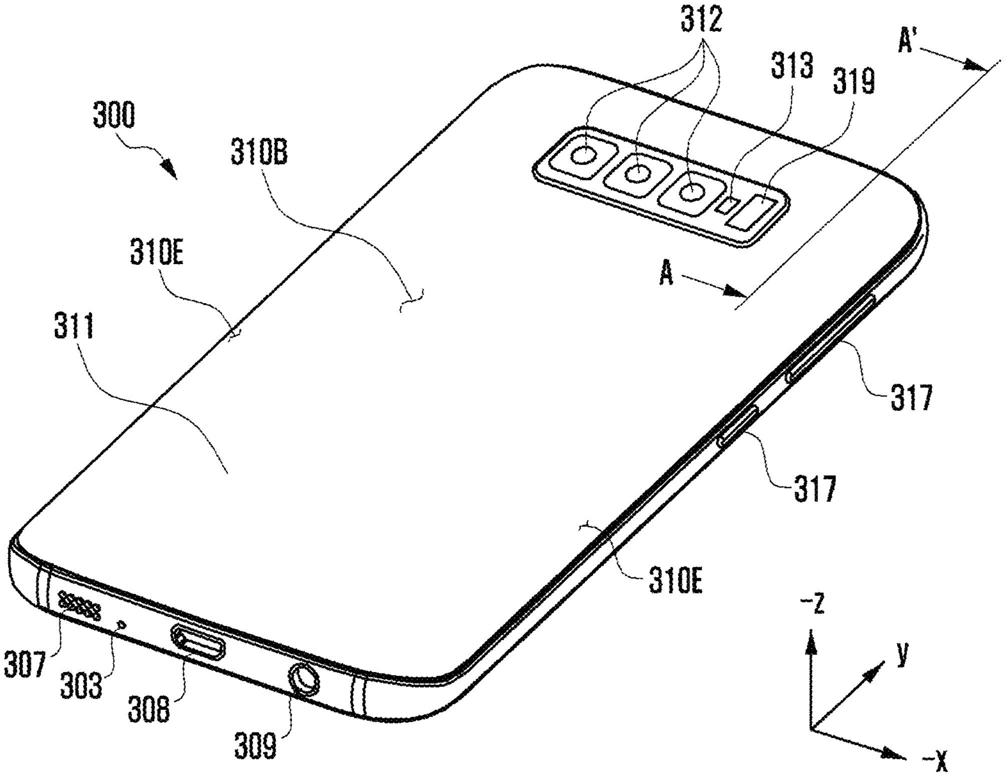
FIG. 3B is a perspective view illustrating a rear surface of a mobile electronic device shown in FIG. 3A according to an embodiment of the disclosure.

FIG. 3B illustrates a perspective view showing a rear surface of the mobile electronic device shown in FIG. 3A according to an embodiment of the disclosure.

Referring to FIGS. 3A and 3B, a mobile electronic device 300 may include a housing 310 that includes a first surface (or front surface) 310A, a second surface (or rear surface) 310B, and a lateral surface 310C that surrounds a space between the first surface 310A and the second surface 310B. The housing 310 may refer to a structure that forms a part of the first surface 310A, the second surface 310B, and the lateral surface 310C. The first surface 310A may be formed of a front plate 302 (e.g., a glass plate or polymer plate coated with a variety of coating layers) at least a part of which is substantially transparent. The second surface 310B may be formed of a rear plate 311 which is substantially opaque. The rear plate 311 may be formed of, for example, coated or colored glass, ceramic, polymer, metal (e.g., aluminum, stainless steel (STS), or magnesium), or any combination thereof. The lateral surface 310C may be formed of a lateral bezel structure (or "lateral member") 318 which is combined with the front plate 302 and the rear plate 311 and includes a metal and/or polymer. The rear plate 311 and the lateral bezel structure 318 may be integrally formed and may be of the same material (e.g., a metallic material such as aluminum).

The front plate 302 may include two first regions 310D disposed at long edges thereof, respectively, and bent and extended seamlessly from the first surface 310A toward the rear plate 311. Similarly, the rear plate 311 may include two second regions 310E disposed at long edges thereof, respectively, and bent and extended seamlessly from the second surface 310B toward the front plate 302. The front plate 302 (or the rear plate 311) may include only one of the first regions 310D (or of the second regions 310E). The first regions 310D or the second regions 310E may be omitted in part. When viewed from a lateral side of the mobile electronic device 300, the lateral bezel structure 318 may have a first thickness (or width) on a lateral side where the first region 310D or the second region 310E is not included, and may have a second thickness, being less than the first thickness, on another lateral side where the first region 310D or the second region 310E is included.

The mobile electronic device 300 may include at least one of a display 301, audio modules 303, 307 and 314, sensor modules 304 and 319, camera modules 305, 312 and 313, a key input device 317, a light emitting device, and connector holes 308 and 309. The mobile electronic device 300 may omit at least one (e.g., the key input device 317 or the light emitting device) of the above components, or may further include other components.

The display 301 may be exposed through a substantial portion of the front plate 302, for example. At least a part of the display 301 may be exposed through the front plate 302 that forms the first surface 310A and the first region 310D of the lateral surface 310C. Outlines (i.e., edges and corners) of the display 301 may have substantially the same form as those of the front plate 302. The spacing between the outline of the display 301 and the outline of the front plate 302 may be substantially unchanged in order to enlarge the exposed area of the display 301.

A recess or opening may be formed in a portion of a display area of the display 301 to accommodate at least one of the audio module 314, the sensor module 304, the camera module 305, and the light emitting device. At least one of the audio module 314, the sensor module 304, the camera module 305, a fingerprint sensor (not shown), and the light emitting element may be disposed on the back of the display area of the display 301. The display 301 may be combined with, or adjacent to, a touch sensing circuit, a pressure sensor capable of measuring the touch strength (pressure), and/or a digitizer for detecting a stylus pen. At least a part of the sensor modules 304 and 319 and/or at least a part of the key input device 317 may be disposed in the first region 310D and/or the second region 310E.

The audio modules 303, 307 and 314 may correspond to a microphone hole 303 and speaker holes 307 and 314, respectively. The microphone hole 303 may contain a microphone disposed therein for acquiring external sounds and, in a case, contain a plurality of microphones to sense a sound direction. The speaker holes 307 and 314 may be classified into an external speaker hole 307 and a call receiver hole 314. The microphone hole 303 and the speaker holes 307 and 314 may be implemented as a single hole, or a speaker (e.g., a piezo speaker) may be provided without the speaker holes 307 and 314.

The sensor modules 304 and 319 may generate electrical signals or data corresponding to an internal operating state of the mobile electronic device 300 or to an external environmental condition. The sensor modules 304 and 319 may include a first sensor module 304 (e.g., a proximity sensor) and/or a second sensor module (e.g., a fingerprint sensor) disposed on the first surface 310A of the housing 310, and/or a third sensor module 319 (e.g., a heart rate monitor (HRM) sensor) and/or a fourth sensor module (e.g., a fingerprint sensor) disposed on the second surface 310B of the housing 310. The fingerprint sensor may be disposed on the second surface 310B as well as the first surface 310A (e.g., the display 301) of the housing 310. The electronic device 300 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 305, 312 and 313 may include a first camera device 305 disposed on the first surface 310A of the electronic device 300, and a second camera module 312 and/or a flash 313 disposed on the second surface 310B. The camera module 305 or the camera module 312 may include one or more lenses, an image sensor, and/or an image signal processor. The flash 313 may include, for example, a light emitting diode or a xenon lamp. Two or more lenses (infrared cameras, wide angle and telephoto lenses) and image sensors may be disposed on one side of the electronic device 300.

The key input device 317 may be disposed on the lateral surface 310C of the housing 310. The mobile electronic device 300 may not include some or all of the key input device 317 described above, and the key input device 317 which is not included may be implemented in another form such as a soft key on the display 301. The key input device 317 may include the sensor module disposed on the second surface 310B of the housing 310.

The light emitting device may be disposed on the first surface 310A of the housing 310. For example, the light emitting device may provide status information of the electronic device 300 in an optical form. The light emitting device may provide a light source associated with the operation of the camera module 305. The light emitting device may include, for example, a light emitting diode (LED), an IR LED, or a xenon lamp.

The connector holes 308 and 309 may include a first connector hole 308 adapted for a connector (e.g., a universal serial bus (USB) connector) for transmitting and receiving power and/or data to and from an external electronic device, and/or a second connector hole 309 adapted for a connector (e.g., an earphone jack) for transmitting and receiving an audio signal to and from an external electronic device.

Some modules 305 of camera modules 305 and 312, some sensor modules 304 of sensor modules 304 and 319, or an indicator may be arranged to be exposed through a display 301. For example, the camera module 305, the sensor module 304, or the indicator may be arranged in the internal space of an electronic device 300 so as to be brought into contact with an external environment through an opening of the display 301, which is perforated up to a front plate 302. In another embodiment, some sensor modules 304 may be arranged to perform their functions without being visually exposed through the front plate 302 in the internal space of the electronic device. For example, in this case, an area of the display 301 facing the sensor module may not require a perforated opening.

Figure 3C:
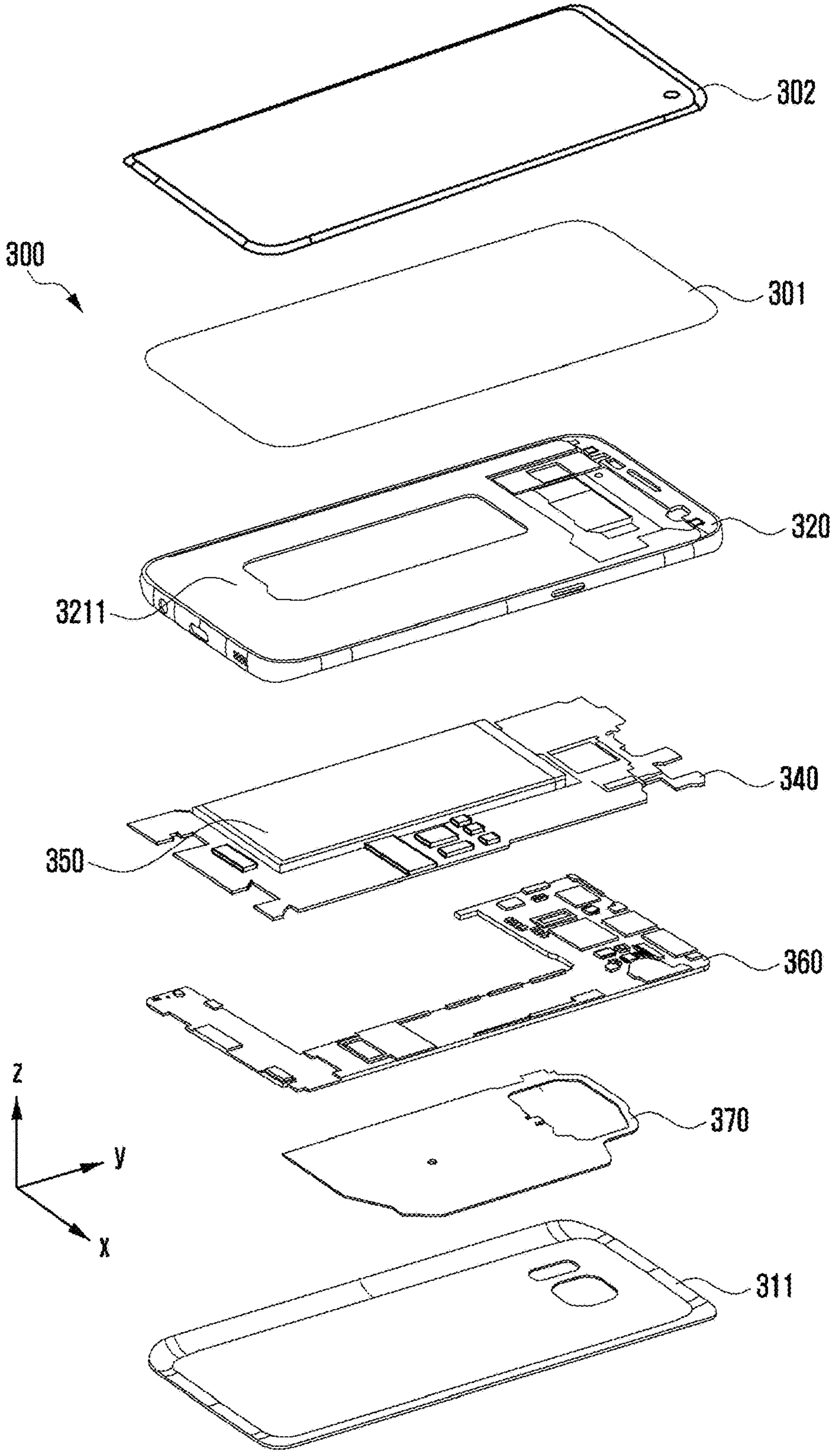
FIG. 3C is an exploded perspective view illustrating a mobile electronic device shown in FIGS. 3A and 3B according to an embodiment of the disclosure.

FIG. 3C illustrates an exploded perspective view showing a mobile electronic device shown in FIG. 3A according to an embodiment of the disclosure.

Referring to FIG. 3C, a mobile electronic device 300 may include a lateral bezel structure 320, a first support member 3211 (e.g., a bracket), a front plate 302, a display 301, an electromagnetic induction panel (not shown), a printed circuit board (PCB) 340, a battery 350, a second support member 360 (e.g., a rear case), an antenna 370, and a rear plate 311. The mobile electronic device 300 may omit at least one (e.g., the first support member 3211 or the second support member 360) of the above components or may further include another component. Some components of the electronic device 300 may be the same as or similar to those of the mobile electronic device 101 shown in FIG. 1 or FIG. 2, thus, descriptions thereof are omitted below.

The first support member 3211 is disposed inside the mobile electronic device 300 and may be connected to, or integrated with, the lateral bezel structure 320. The first support member 3211 may be formed of, for example, a metallic material and/or a non-metal (e.g., polymer) material. The first support member 3211 may be combined with the display 301 at one side thereof and also combined with the printed circuit board (PCB) 340 at the other side thereof. On the PCB 340, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, one or more of a volatile memory and a non-volatile memory.

The interface may include, for example, a high definition multimedia interface (HDMI), a USB interface, a secure digital (SD) card interface, and/or an audio interface. The interface may electrically or physically connect the mobile electronic device 300 with an external electronic device and may include a USB connector, an SD card/multimedia card (MMC) connector, or an audio connector.

The battery 350 is a device for supplying power to at least one component of the mobile electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the mobile electronic device 300, and may be detachably disposed from the mobile electronic device 300.

The antenna 370 may be disposed between the rear plate 311 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 320 and/or the first support member 3211.

Figure 4A:
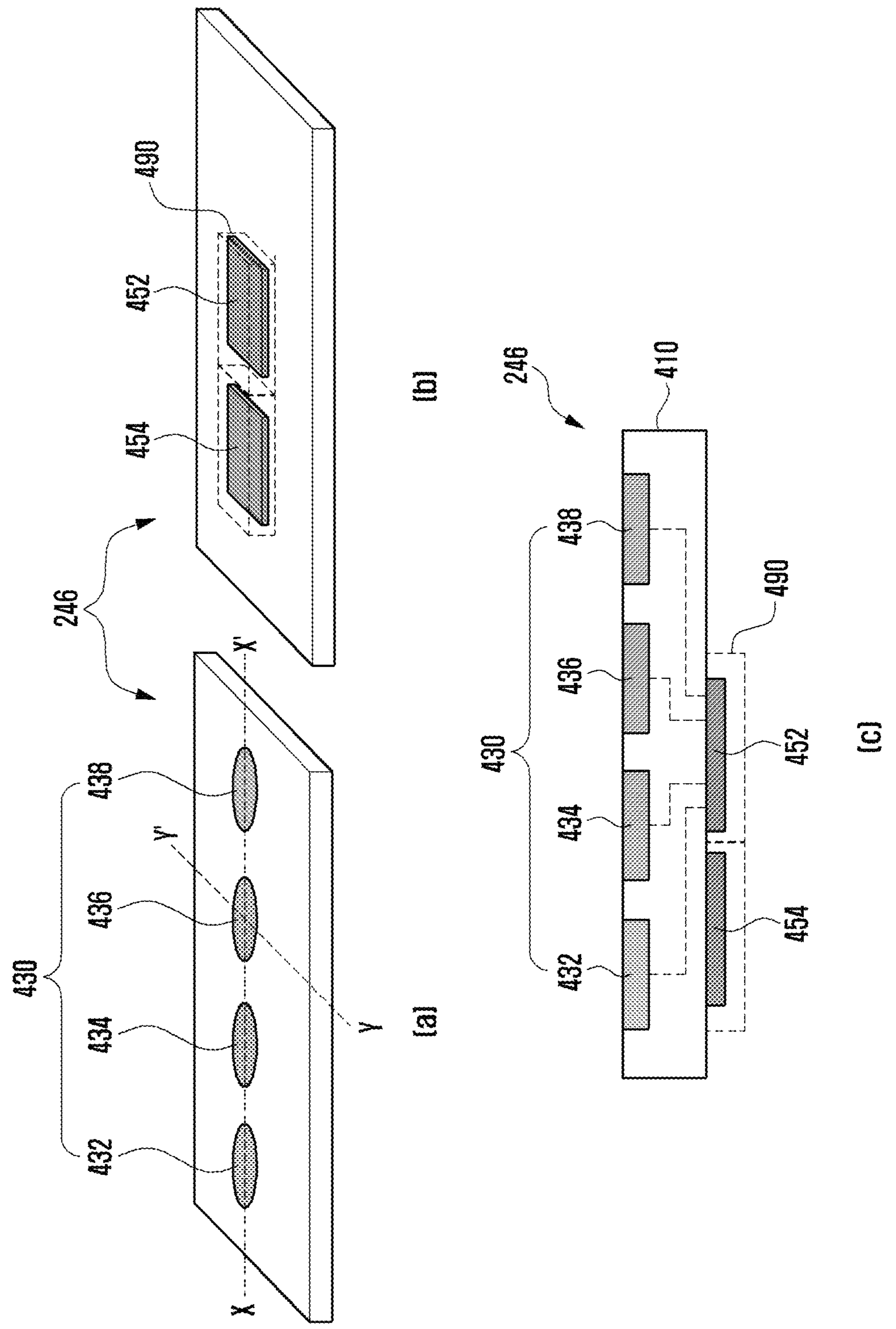
FIG. 4A is a diagram illustrating an embodiment of a structure of a third antenna module shown in and described with reference to FIG. 2 according to an embodiment of the disclosure.

FIG. 4A is a diagram illustrating a structure of, for example, a third antenna module described with reference to FIG. 2 according to an embodiment of the disclosure.

Referring to FIG. 4A, in panel (a) is a perspective view illustrating the third antenna module 246 viewed from one side, and FIG. 4A in panel (b) is a perspective view illustrating the third antenna module 246 viewed from the other side. FIG. 4A in panel (c) is a cross-sectional view illustrating the third antenna module 246 taken along line X-X' of FIG. 4A.

With reference to FIG. 4A, in one embodiment, the third antenna module 246 may include a printed circuit board 410, an antenna array 430, a RFIC 452, and a PMIC 454. Alternatively, the third antenna module 246 may further include a shield member 490. In other embodiments, at least one of the above-described components may be omitted or at least two of the components may be integrally formed.

The printed circuit board 410 may include a plurality of conductive layers and a plurality of non-conductive layers stacked alternately with the conductive layers. The printed circuit board 410 may provide electrical connections between the printed circuit board 410 and/or various electronic components disposed outside using wirings and conductive vias formed in the conductive layer.

The antenna array 430 (e.g., 248 of FIG. 2) may include a plurality of antenna elements 432, 434, 436, or 438 disposed to form a directional beam. As illustrated, the antenna elements 432, 434, 436, or 438 may be formed at a first surface of the printed circuit board 410. According to another embodiment, the antenna array 430 may be formed inside the printed circuit board 410. According to the embodiment, the antenna array 430 may include the same or a different shape or kind of a plurality of antenna arrays (e.g., dipole antenna array and/or patch antenna array).

The RFIC 452 (e.g., the third RFIC 226 of FIG. 2) may be disposed at another area (e.g., a second surface opposite to the first surface) of the printed circuit board 410 spaced apart from the antenna array. The RFIC 452 is configured to process signals of a selected frequency band transmitted/received through the antenna array 430. According to one embodiment, upon transmission, the RFIC 452 may convert a baseband signal obtained from a communication processor (not shown) to an RF signal of a designated band. Upon reception, the RFIC 452 may convert an RF signal received through the antenna array 430 to a baseband signal and transfer the baseband signal to the communication processor.

According to another embodiment, upon transmission, the RFIC 452 may up-convert an IF signal (e.g., about 9 GHz to about 11 GHz) obtained from an intermediate frequency integrate circuit (IFIC) (e.g., 228 of FIG. 2) to an RF signal of a selected band. Upon reception, the RFIC 452 may down-convert the RF signal obtained through the antenna array 430, convert the RF signal to an IF signal, and transfer the IF signal to the IFIC.

The PMIC 454 may be disposed in another partial area (e.g., the second surface) of the printed circuit board 410 spaced apart from the antenna array 430. The PMIC 454 may receive a voltage from a main PCB (not illustrated) to provide power necessary for various components (e.g., the RFIC 452) on the antenna module.

The shielding member 490 may be disposed at a portion (e.g., the second surface) of the printed circuit board 410 so as to electromagnetically shield at least one of the RFIC 452 or the PMIC 454. According to one embodiment, the shield member 490 may include a shield can.

Although not shown, in various embodiments, the third antenna module 246 may be electrically connected to another printed circuit board (e.g., main circuit board) through a module interface. The module interface may include a connecting member, for example, a coaxial cable connector, board to board connector, interposer, or flexible printed circuit board (FPCB). The RFIC 452 and/or the PMIC 454 of the antenna module may be electrically connected to the printed circuit board through the connection member.

Figure 4B:
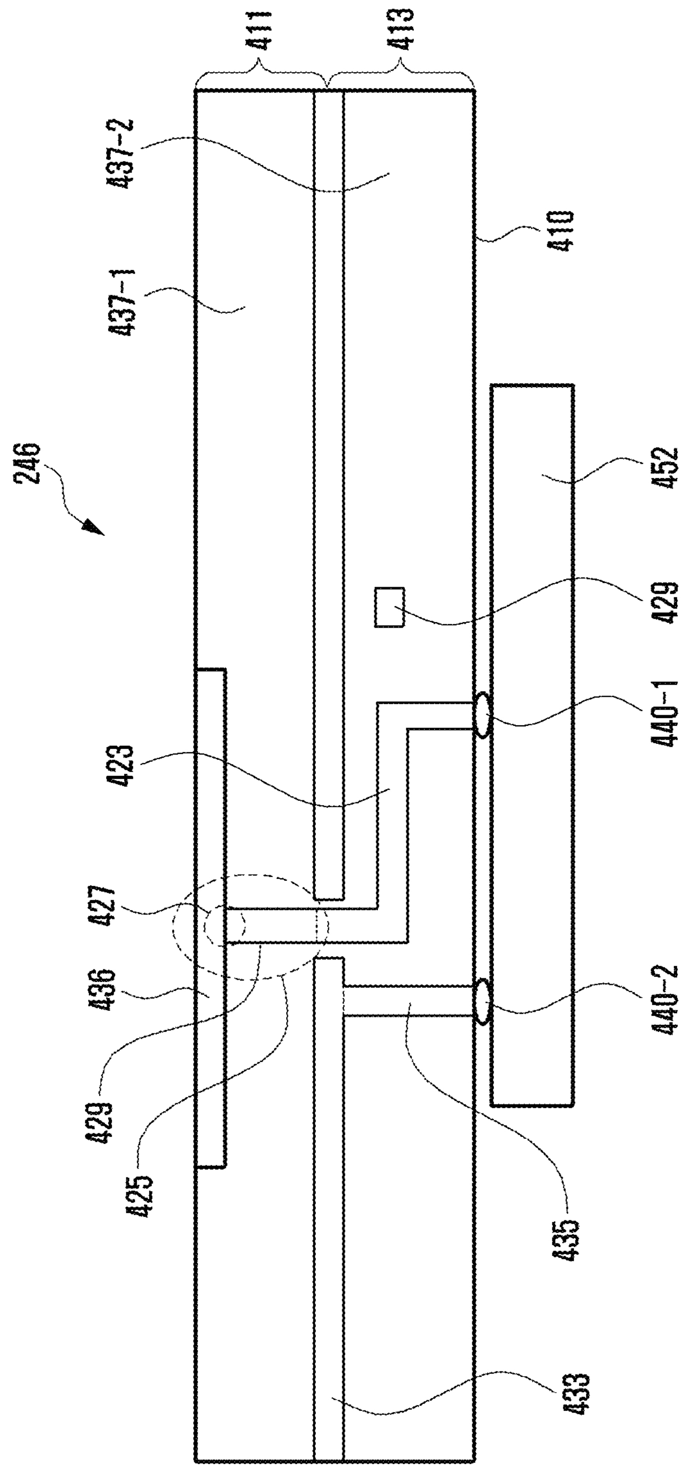
FIG. 4B is a cross-sectional view taken along the line Y-Y' in FIG. 4A according to an embodiment of the disclosure.

FIG. 4B is a cross-sectional view illustrating the third antenna module 246 taken along line Y-Y' of FIG. 4A in panel (a) according to an embodiment of the disclosure. The printed circuit board 410 of the illustrated embodiment may include an antenna layer 411 and a network layer 413.

Referring to FIG. 4B, the antenna layer 411 may include at least one dielectric layer 437-1, and an antenna element 436 and/or a power feeding portion 425 formed on or inside an outer surface of a dielectric layer. The power feeding portion 425 may include a power feeding point 427 and/or a power feeding line 429.

The network layer 413 may include at least one dielectric layer 437-2, at least one ground layer 433, at least one conductive via 435, a transmission line 423, and/or a power feeding line 429 formed on or inside an outer surface of the dielectric layer.

Further, in the illustrated embodiment, the RFIC 452 (e.g., the third RFIC 226 of FIG. 2) of FIG. 4A in panel (c) may be electrically connected to the network layer 413 through, for example, first and second solder bumps 440-1 and 440-2. In other embodiments, various connection structures (e.g., solder or ball grid array (BGA)) instead of the solder bumps may be used. The RFIC 452 may be electrically connected to the antenna element 436 through the first solder bump 440-1, the transmission line 423, and the power feeding portion 425. The RFIC 452 may also be electrically connected to the ground layer 433 through the second solder bump 440-2 and the conductive via 435. Although not illustrated, the RFIC 452 may also be electrically connected to the above-described module interface through the power feeding line 429.

Figure 5:
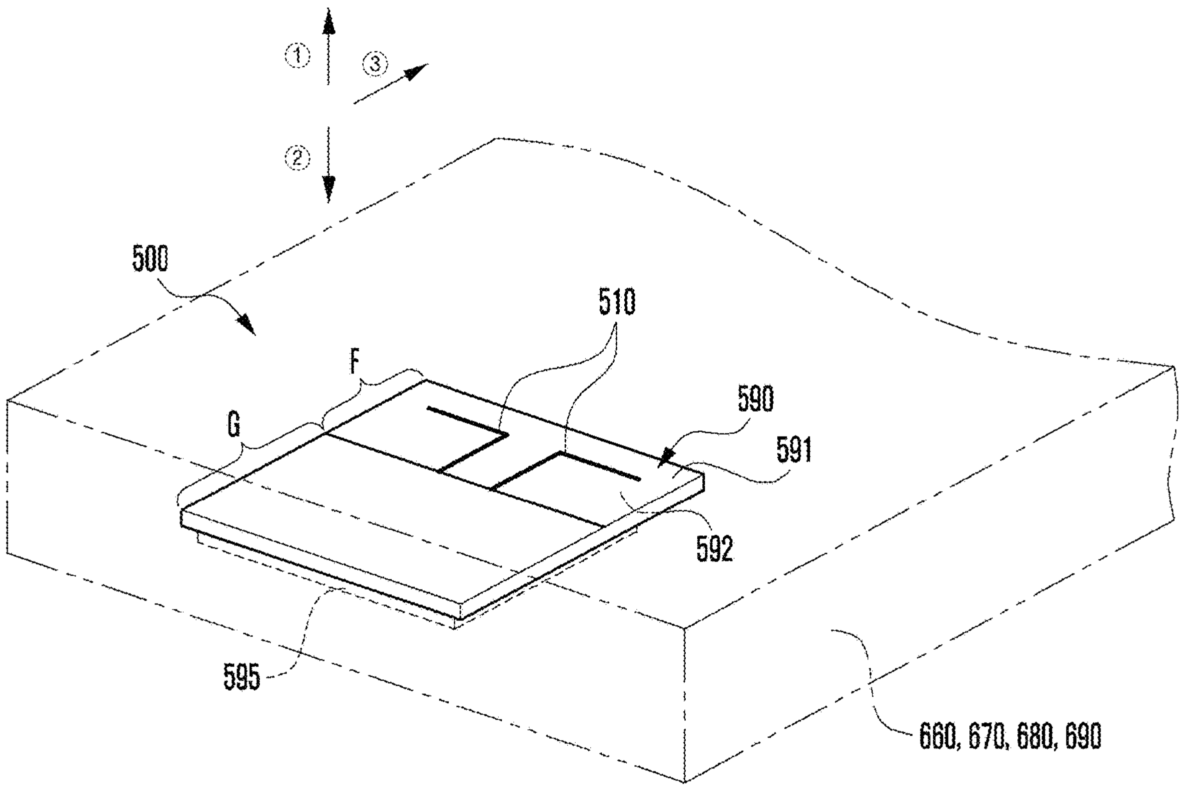
FIG. 5 is a perspective view illustrating an antenna structure according to an embodiment of the disclosure.

FIG. 5 is a perspective view illustrating an antenna structure according to an embodiment of the disclosure.

An antenna module including the antenna structure an and a wireless communication circuit 595, shown in FIG. 5, may be similar, at least in part, to the third antenna module 246 of FIG. 2, or may include other embodiments of the antenna module.

Referring to FIG. 5, the antenna structure 500 may include a printed circuit board (PCB) 590 (or a substrate), a conductive pattern 510 disposed on or in the PCB 590 (e.g., an antenna element), and at least one dielectric structure 660, 670, 680, and/or 690 disposed near the PCB 590 or disposed to support the PCB 590 at least in part.

According to various embodiments, the PCB 590 may have a first surface 591 facing a first direction (denoted by ①) and a second surface 592 facing a second direction (denoted by ②) opposite to the first direction. According to an embodiment, the conductive pattern 510 may include a dipole antenna disposed in an inner space between the first surface 591 and the second surface 592 of the PCB 590. According to an embodiment, the conductive pattern 510 may be disposed in a fill-and-cut region F of the PCB 590, which is a non-conductive region separated from a ground region G of the PCB 590.

According to various embodiments, the wireless communication circuit 595 may be mounted on the second surface 592 and electrically connected to the conductive pattern 510. In another embodiment, the wireless communication circuit 595 may be disposed in the inner space of the electronic device (e.g., the electronic device 300 in FIG. 3A) to be spaced apart from the antenna structure 500, and electrically connected to the PCB 590 through an electrical connection member (e.g., a flexible PCB (FPCB) connector).

According to various embodiments, the antenna structure 500 may be disposed in the inner space of the electronic device (e.g., the electronic device 300 in FIG. 3A) to form a beam pattern in a third direction (denoted by ③) perpendicular to the first direction (denoted by ①) through the conductive pattern 510. According to an embodiment, the third direction (denoted by ③) may be a direction in which the lateral surface (e.g., the lateral surface 310C in FIG. 3A) of the electronic device (e.g., the electronic device 300 in FIG. 3A) faces. According to an embodiment, the wireless communication circuit 595 may be configured to transmit and/or receive a radio signal in a frequency range of about 3 GHz to about 100 GHz through the conductive pattern 510.

According to various embodiments, the at least one dielectric structure 660, 670, 680, or 690 may be disposed to support the PCB 590 at least partially. In another embodiment, the dielectric structure 660, 670, 680, or 690 may include a support member (e.g., a bracket) made of a polymer material and disposed in the inner space of the electronic device. In another embodiment, the dielectric structure 660, 670, 680, or 690 may include a support structure made of a polymer material and extended at least in part from the lateral member into the inner space of the electronic device. In yet another embodiment, the dielectric structure 660, 670, 680, or 690 may include any structure provided separately to improve the beam pattern directivity, beam coverage, and/or gain of the conductive pattern 510 operating as a dipole antenna. According to an embodiment, the dielectric structure 660, 670, 680, or 690 may include areas having different dielectric constants at least in part. The dielectric structure 660, 670, 680, or 690 may provide a propagation induction path resulting from a difference in the dielectric constant and thereby contribute to improving the radiation performance of the antenna.

Figure 6:
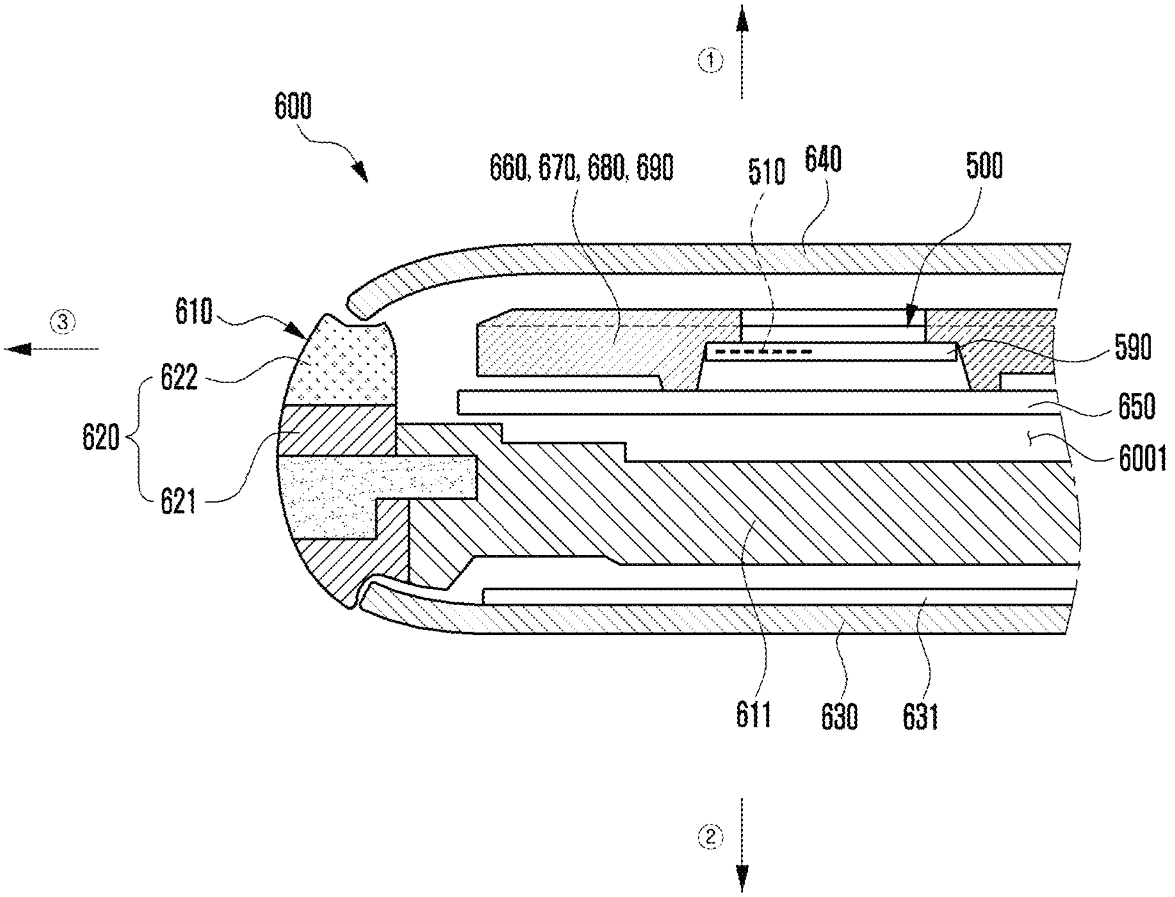
FIG. 6 is a cross-sectional view partially showing an electronic device, viewed from the line A-A' in FIG. 3B, according to an embodiment of the disclosure.

FIG. 6 is a cross-sectional view partially showing an electronic device 600, viewed from the line A-A' in FIG. 3B, according to an embodiment of the disclosure.

The electronic device 600 shown in FIG. 6 may be similar, at least in part, to the electronic device 101 of FIG. 1 or the electronic device 300 of FIG. 3A, or may include other embodiments of the electronic device.

Referring to FIG. 6, the electronic device 600 may include a housing 610 that includes a front cover 630 (e.g., a first cover or a first plate) facing a second direction (denoted by ②) (e.g., the Z-axis direction in FIG. 3A), a rear cover 640 (e.g., a second cover or a second plate) facing a first direction (denoted by ①) (e.g., the negative Z-axis direction in FIG. 3B) opposite to the front cover 630, and a lateral member 620 surrounding an inner space 6001 between the front cover 630 and the rear cover 640. According to an embodiment, the lateral member 620 may include a conductive portion 621 disposed at least in part and a polymer portion 622 (e.g., a non-conductive portion) injected (e.g., insert-injected or double-injected) into the conductive portion 621. In another embodiment, the polymer portion 622 may be replaced with a space or any other dielectric material. In another embodiment, the polymer portion 622 may be structurally combined with the conductive portion 621.

According to an embodiment, the lateral member 620 may include a support member 611 (e.g., the first support member 3211 in FIG. 3C) extended at least partially into the inner space 6001. According to an embodiment, the support member 611 may be extended from the lateral member 620 into the inner space 6001 or formed by a structural coupling with the lateral member 620. According to an embodiment, the support member 611 may be extended from the conductive portion 621. According to an embodiment, the support member 611 may include a conductive member and/or a polymer member at least partially injected into the conductive member. According to an embodiment, the support member 611 may support at least in part a device substrate 650 (e.g., a main substrate) and/or a display 631 disposed in the inner space 6001. In another embodiment, the support member 611 may support at least a portion of a battery (e.g., the battery 350 in FIG. 3C) disposed in the inner space 6001. According to an embodiment, the display 631 may be disposed in the inner space 6001 to be visible from the outside through at least a portion of the front cover 630.

According to various embodiments, the antenna structure 500 may include the PCB 590 including the conductive pattern 510 operating as a dipole antenna, and the dielectric structure 660, 670, 680, or 690 disposed in the inner space 6001 to support at least in part the PCB 590. According to an embodiment, the PCB 590 may be disposed in parallel with the rear cover 640 in the inner space 6001 of the electronic device 600. For example, the PCB 590 may be disposed to be supported by at least a portion of the dielectric structure 660, 670, 680, or 690. In another embodiment, the PCB 590 may be disposed near the dielectric structure 660, 670, 680, or 690 in the inner space 6001 of the electronic device 600. According to an embodiment, the conductive pattern 510 may be disposed on or in the PCB 590 to form a beam pattern in the third direction (denoted by ③) facing the lateral member 620 and being perpendicular to the first direction (denoted by ①). In another embodiment, the conductive pattern 510 may be arranged to form a beam pattern directed toward a space between the third direction (denoted by ③) and the second direction (denoted by ②) as well as a beam pattern directed in the third direction (denoted by ③). In another embodiment, the conductive pattern 510 may be arranged to form a beam pattern directed toward a space between the third direction (denoted by ③) and the first direction (denoted by ①) as well as a beam pattern directed in the third direction (denoted by ③).

According to various embodiments, a beam pattern formed in the third direction (denoted by ③) from the conductive pattern 510 may be subjected to interference and/or distortion due to the conductive portion 621 of the lateral member 620, and may be partially overlapped with another beam pattern formed in another direction from another antenna (e.g., a conductive patch antenna). This may cause a reduction in the beam coverage of the antenna, thereby deteriorating the radiation performance.

The electronic device 600 according to an embodiment of the disclosure includes the dielectric structure 660, 670, 680, or 690 disposed on a radiation path of the beam pattern formed from the conductive pattern 510 between the PCB 590 and the lateral member 620 in the inner space 6001. The dielectric structure 660, 670, 680, or 690 can increase the directivity and/or gain of the beam pattern and/or expand the beam coverage, thus improving the radiation performance of the antenna.

Figure 7:
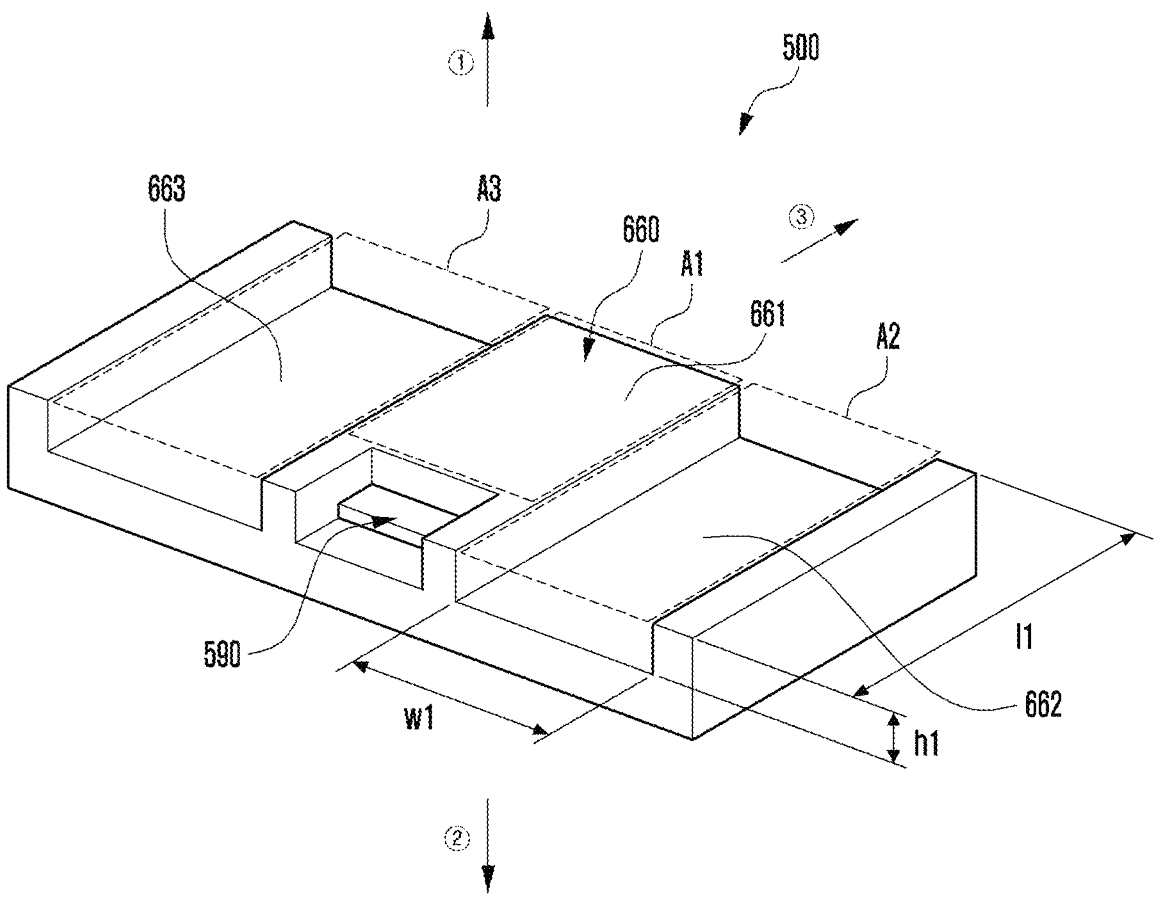
FIG. 7 is a perspective view illustrating an antenna structure according to an embodiment of the disclosure.

FIG. 7 is a perspective view illustrating an antenna structure 500 according to an embodiment of the disclosure.

Referring to FIG. 7, the antenna structure 500 may include the PCB 590 including a conductive pattern (e.g., the conductive pattern 510 in FIG. 5) forming a beam pattern in the third direction (denoted by a), and a dielectric structure 660 disposed near the PCB 590 or disposed such that the PCB 590 is mounted at least in part. According to an embodiment, the dielectric structure 660 may be formed of a polymer material such as polycarbonate (PC).

According to various embodiments, the dielectric structure 660 may include a first area A1 corresponding to the PCB 590 and disposed on a radiation path of a beam pattern formed from the conductive pattern 510, a second area A2 adjacent to one side of the first area A1, and/or a third area A3 adjacent to the other side of the first area A1. According to an embodiment, between the PCB 590 and the lateral member (e.g., the lateral member 620 in FIG. 6), the first area A1 may encompass the radiation path of the beam pattern formed from the conductive pattern 510. According to an embodiment, the first area A1 may be overlapped at least in part with the PCB 590 when the lateral member 620 is viewed from the outside.

According to various embodiments, the first area A1, the second area A2, and/or the third area A3 may have different dielectric constants. For example, the first area A1 may be formed to have a first dielectric constant. According to an embodiment, the second area A2 may be formed to have a second dielectric constant lower than the first dielectric constant. According to an embodiment, the third area A3 may also be formed to have a third dielectric constant lower than the first dielectric constant. According to an embodiment, the second dielectric constant and the third dielectric constant may be substantially equal to or different from each other.

According to various embodiments, in the dielectric structure 660, the second area A2 may have a recess 662 formed lower than a surface 661 of the first area A1 facing the first direction (denoted by ①). The second area A2 may be formed to have the second dielectric constant lower than the first dielectric constant of the first area A1 through the recess 662. According to an embodiment, the recess 662 may be formed to have a certain width (w1), a certain length (l1), and a certain depth (h1). According to an embodiment, the second dielectric constant of the second area A2 may be determined by changing at least one of the width (w1), the length (l1), or the depth (h1) of the recess 662. According to an embodiment, the third area A3 may also have a recess 663 formed to resemble the recess 662 of the second area A2. According to an embodiment, the dielectric structure 660 may include a filling member that is filled in the recesses 662 and 663 of the second and third areas A2 and A3 and has a dielectric constant lower than the first dielectric constant of the first area A1. According to one embodiment, the filling member may reinforce the rigidity of the dielectric structure 660 by compensating for a loss of thickness due to the recess. According to various embodiments, the filling member may be disposed in the recesses 662 and 663 through injection into or structural coupling with the dielectric structure 660.

According to various embodiments, the beam pattern formed from the conductive pattern 510 of the PCB 590 is arranged on the radiation path along the first area A1 having a higher dielectric constant between the second area A2 and the third area A3 each having a lower dielectric constant. Because radio waves have a property to proceed along the first area A1 having a higher dielectric constant, the beam pattern with excellent directivity and extended beam coverage can be induced.

Figure 8:
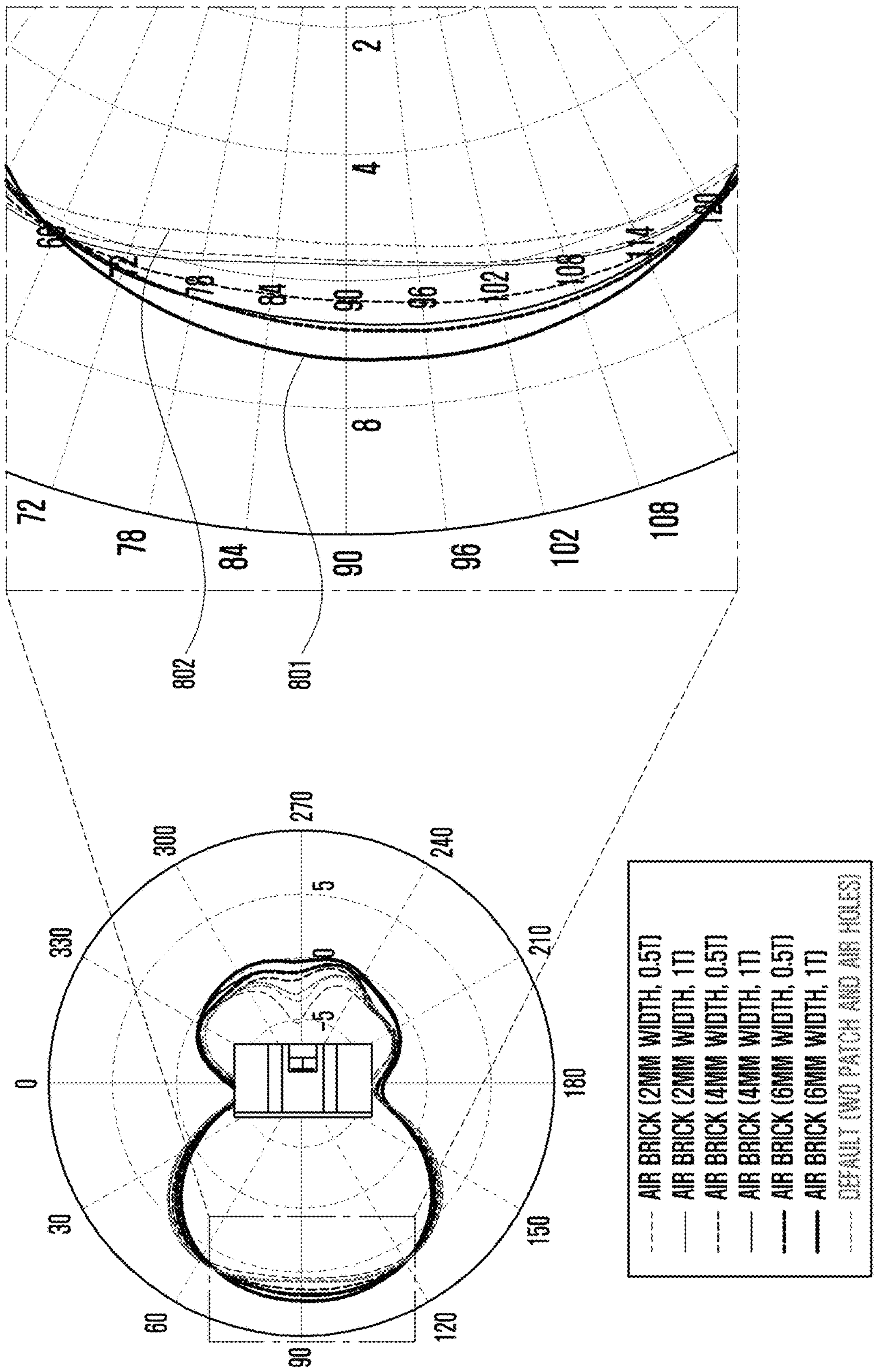
FIG. 8 is a diagram comparing radiation patterns depending on a width and depth of a recess of an antenna structure shown in FIG. 7 according to an embodiment of the disclosure.

FIG. 8 is a diagram comparing radiation patterns depending on a width and depth of the recess of an antenna structure shown in FIG. 7 according to an embodiment of the disclosure.

Referring to FIG. 8, it shows the radiation patterns of the antenna structure 500 when the width (w1) of each recess 662, 663 formed in each of the second and third area A2 and A3 of the dielectric structure 660 is sequentially changed to 2 mm, 4 mm, and 6 mm, and also the depth (h1) is sequentially changed to 0.5 mm and 1 mm. As shown, when the recess has a width of 2 mm and a depth of 0.5 mm, a gain of the antenna structure 500 is about 5.4 dBi (802 graph), whereas when the recess has a width of 6 mm and a depth of 1 mm, a gain is about 7.2 dBi (801 graph). As a result, it can be seen that the gain is improved by about 1.8 dB at 90 degrees. Accordingly, as the width w1 and depth h1 of the recess 662, 663 increase, the antenna structure 500 has an excellent beam focusing effect.

Figure 9:
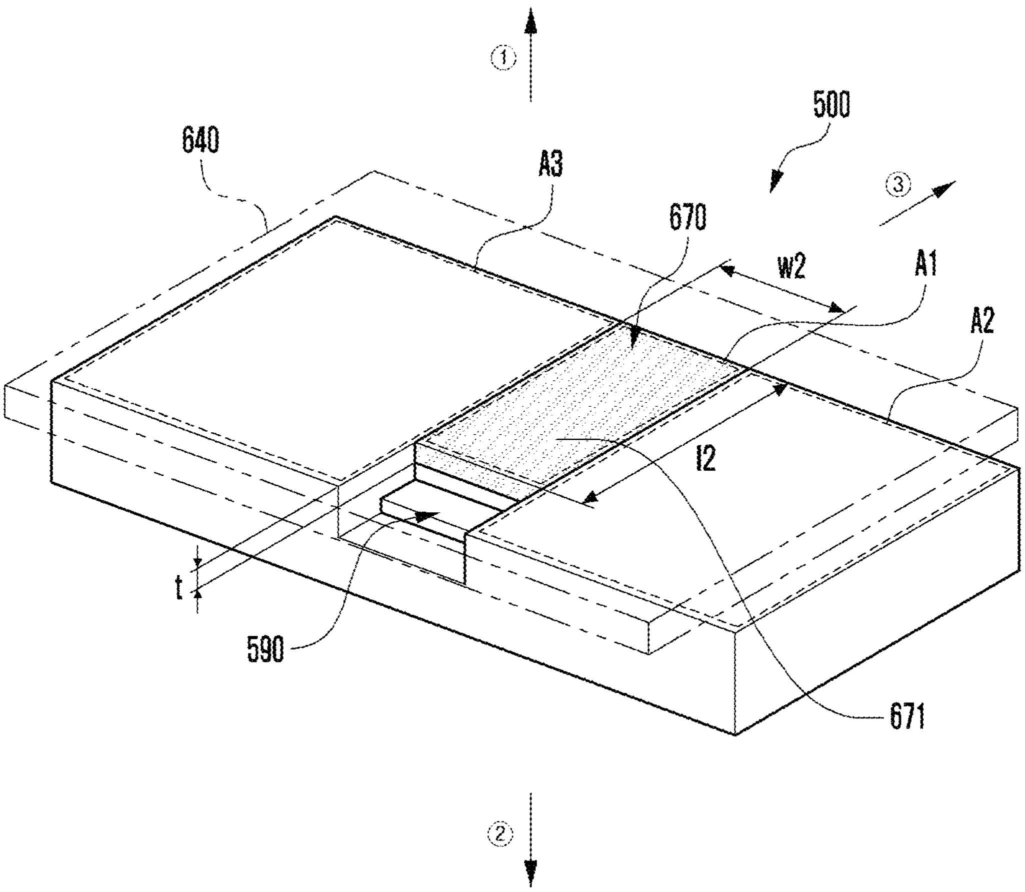
FIG. 9 is a perspective view illustrating an antenna structure according to an embodiment of the disclosure.

FIG. 9 is a perspective view illustrating an antenna structure according to an embodiment of the disclosure.

Referring to FIG. 9, the antenna structure 500 may include the PCB 590 and a dielectric structure 670 (e.g., a first dielectric structure) disposed near the PCB 590 or disposed such that the PCB 590 is mounted at least in part. According to an embodiment, the dielectric structure 670 may include the first area A1 corresponding to the PCB 590 and disposed on the radiation path of the beam pattern formed from the conductive pattern (e.g., the conductive pattern 510 in FIG. 5), the second area A2 adjacent to one side of the first area A1, and the third area A3 adjacent to the other side of the first area A1. According to an embodiment, between the PCB 590 and the lateral member (e.g., the lateral member 620 in FIG. 6), the first area A1 may encompass the radiation path of the beam pattern formed from the conductive pattern 510.

According to various embodiments, the first area A1, the second area A2, and the third area A3 may have different dielectric constants. For example, through a high-dielectric injected portion 671 (e.g., a second dielectric structure), the first area A1 may be formed to have a dielectric constant higher than dielectric constants of the second and third areas A2 and A3. According to an embodiment, the high-dielectric injected portion 671 may be insert-injected so as not to penetrate a surface of the dielectric structure 670 facing the second direction (denoted by ②). Thus, the high-dielectric injected portion 671 may be disposed between the dielectric structure 670 and the rear cover 640 in the inner space (e.g., the inner space 6001 in FIG. 6) of the electronic device (e.g., the electronic device 600 in FIG. 6). According to an embodiment, through the high-dielectric injected portion 671 disposed in the first area A1, the dielectric structure 670 may have a dielectric constant higher than the dielectric constant of the rear cover 640. Because the high-dielectric injected portion 671 having a relatively high dielectric constant is disposed between the rear cover 640 and the dielectric structure 670 having relatively low dielectric constants in the first area A1 in the second direction (denoted by ②), it is possible to increase the directivity and gain of the beam pattern formed from the conductive pattern 510. According to an embodiment, the dielectric constant (Dk) of the high-dielectric injected portion 671 may have a range of 5 to 25.

According to various embodiments, the high-dielectric injected portion 671 may be disposed in the first area A1 in the form of insert-injection such that its surface coincides with the surface of the dielectric structure 670 that faces the first direction (denoted by ①). Forming the first area A1 containing the high-dielectric injected portion 671 to have a plane coincident with the second and third areas A2 and A3 may improve an assembling property. In another embodiment, the high-dielectric injected portion 671 may be attached onto the dielectric structure 670 or may be disposed through a structural coupling (e.g., interference fit or tight fit).

According to various embodiments, the high-dielectric injected portion 671 may be formed to have a certain width (w2), a certain length (l2), and a certain thickness (t). According to an embodiment, the dielectric constant of the high-dielectric injected portion 671 may be determined by changing at least one of the width (w2), the length (l2), or the thickness (t).

Figure 10A:
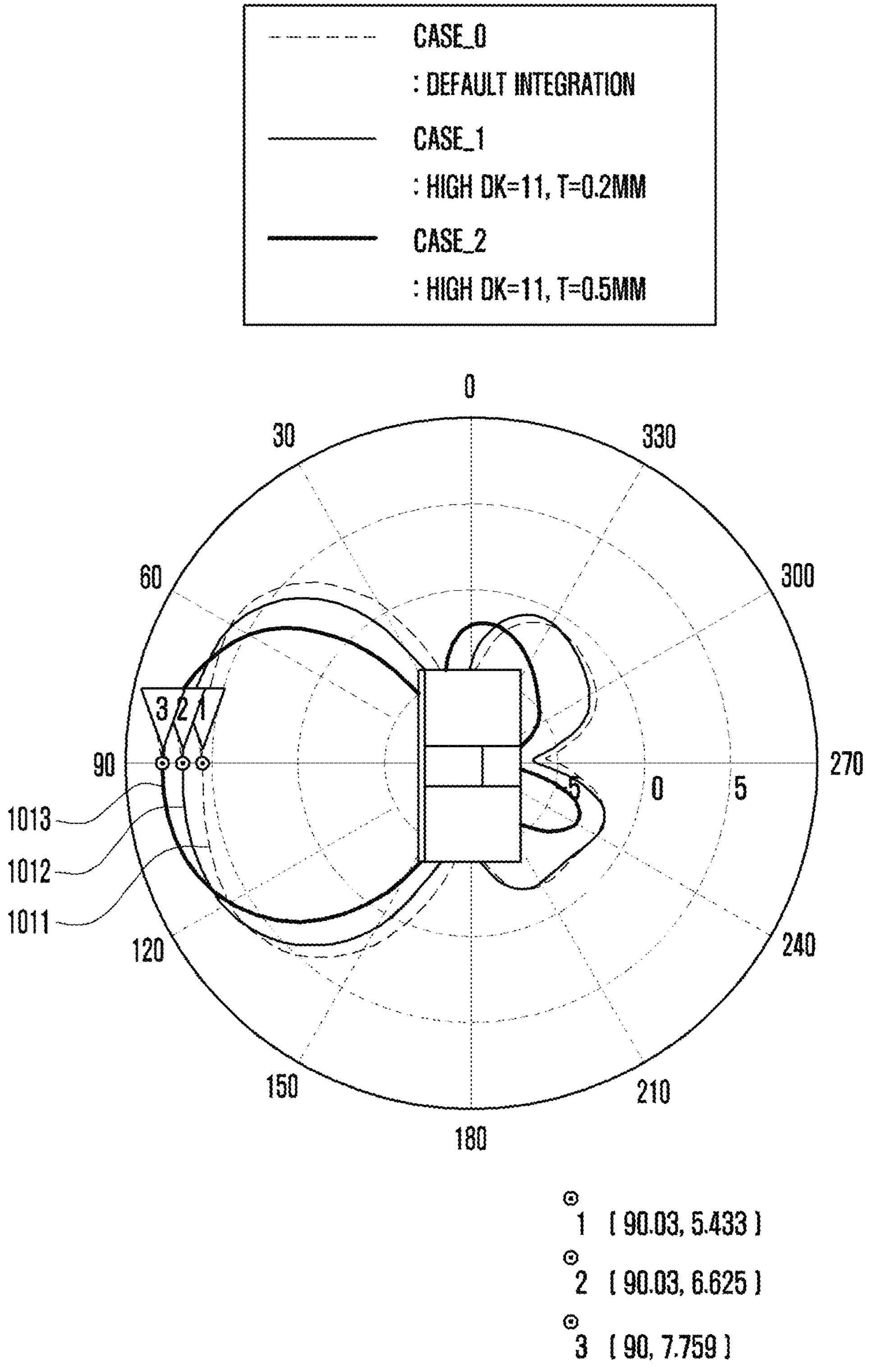
FIGS. 10A and 10B are diagrams comparing radiation patterns depending on a thickness of a high-dielectric injected portion of an antenna structure shown in FIG. 9 on XY-plane and YZ-plane, respectively according to various embodiments of the disclosure.
Figure 10B:
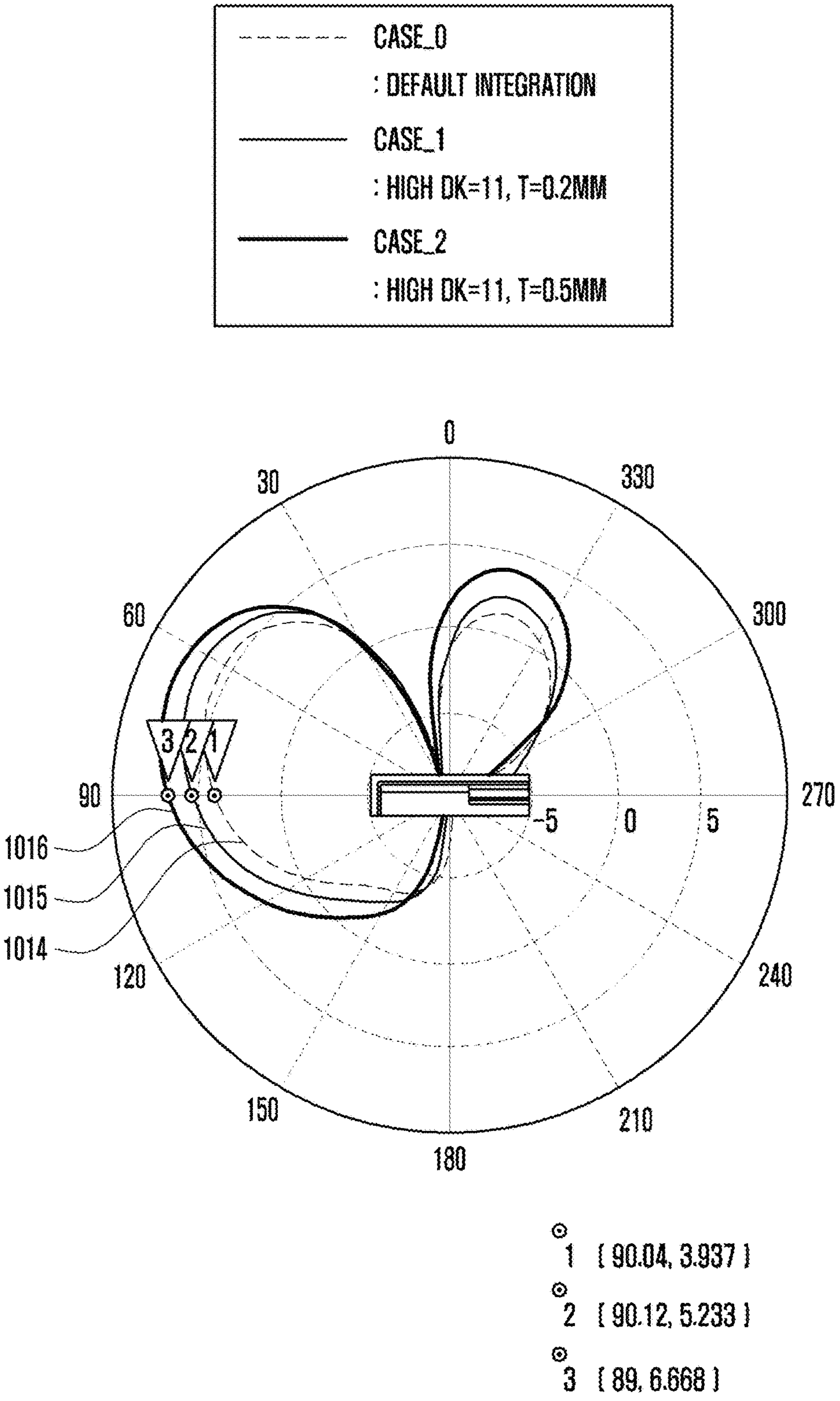

FIGS. 10A and 10B are diagrams comparing radiation patterns depending on a thickness of a high-dielectric injected portion of an antenna structure shown in FIG. 9 on XY-plane and YZ-plane, respectively according to an embodiment of the disclosure.

FIGS. 10A and 10B show, on XY-plane and YZ-plane, a variation of radiation strength when the thickness (t) of the high-dielectric injected portion 671 having a dielectric constant of 11 is changed to 0.2 mm (case 1) and 0.5 mm (case 2).

Referring to FIG. 10A, on the XY-plane, the gain is about 5.4 dBi in case of no high-dielectric injected portion (1011 graph), is about 6.6 dBi in case of the high-dielectric injected portion 671 having a thickness of 0.2 mm (1012 graph), and is about 7.7 dBi in case of the high-dielectric injected portion 671 having a thickness of 0.5 mm (1013 graph). Accordingly, as the thickness (t) of the high-dielectric injected portion 671 becomes thicker, the antenna structure 500 has an improved directivity because of a narrower half power beam width (HPBW) and thus has an excellent beam focusing effect.

Referring to FIG. 10B, on the YZ-plane, the gain is about 3.9 dBi in case of no high-dielectric injected portion (1014 graph), is about 5.2 dBi in case of the high-dielectric injected portion 671 having a thickness of 0.2 mm (1015 graph), and is about 6.6 dBi in case of the high-dielectric injected portion 671 having a thickness of 0.5 mm (1016 graph). Accordingly, as the thickness (t) of the high-dielectric injected portion 671 becomes thicker, the antenna structure 500 has an increased radiation strength at 90 to 150 degrees and thus has an improved beam coverage.

Figure 11:
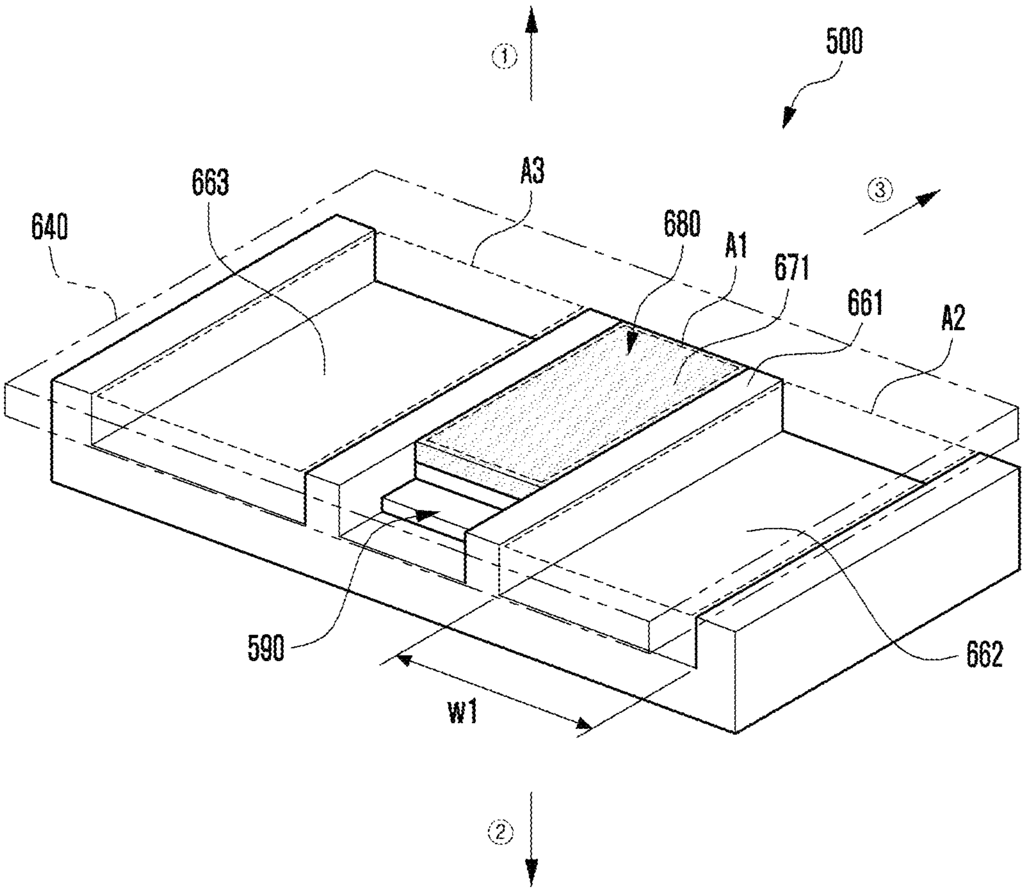
FIG. 11 is a perspective view illustrating an antenna structure according to an embodiment of the disclosure.

FIG. 11 is a perspective view illustrating an antenna structure according to an embodiment of the disclosure.

In the antenna structure 500 of FIG. 11, both the recesses 662 and 663 of FIG. 7 and the high-dielectric injected portion 671 of FIG. 9 are applied together. Thus, repetition of descriptions may be avoided.

Referring to FIG. 11, the antenna structure 500 may include the PCB 590 and a dielectric structure 680 disposed near the PCB 590 or disposed such that the PCB 590 is mounted at least in part. According to an embodiment, the dielectric structure 680 may include the first area A1 corresponding to the PCB 590 and disposed on the radiation path of the beam pattern formed from the conductive pattern (e.g., the conductive pattern 510 in FIG. 5), the second area A2 adjacent to one side of the first area A1, and the third area A3 adjacent to the other side of the first area A1. According to an embodiment, between the PCB 590 and the lateral member (e.g., the lateral member 620 in FIG. 6), the first area A1 may encompass the radiation path of the beam pattern formed from the conductive pattern 510.

According to various embodiments, through the high-dielectric injected portion 671 disposed to have a relatively high dielectric constant, the first area A1 may be formed to have a dielectric constant higher than dielectric constants of the second and third areas A2 and A3. According to an embodiment, each of the second and third areas A2 and A3 may be formed to have a dielectric constant lower than the dielectric constant of the first area A1 through the recesses 662 and 663 formed lower than the surface 661 of the dielectric structure 680 facing the first direction (denoted by ①). Thus, the first area A1 having a relatively high dielectric constant may be disposed vertically between the dielectric structure 680 and the rear cover 640 both having relatively low dielectric constants in the first direction (denoted by ①), and also disposed horizontally between the second and third areas A2 and A3 both having relatively low dielectric constants and having the recesses 662 and 663. It is therefore possible to increase the directivity and gain of the beam pattern formed from the conductive pattern 510.

According to various embodiments, the high-dielectric injected portion 671 may be disposed between the dielectric structure 680 and the rear cover 640 in the inner space (e.g., the inner space 6001 in FIG. 6) of the electronic device (e.g., the electronic device 600 in FIG. 6). According to an embodiment, through the high-dielectric injected portion 671 disposed in the first area A1, the dielectric structure 680 may have a dielectric constant higher than the dielectric constant of the rear cover 640. Because the high-dielectric injected portion 671 having a relatively high dielectric constant is disposed between the rear cover 640 and the dielectric structure 680 having relatively low dielectric constants in the first area A1 in the second direction (denoted by ②), it is possible to increase the directivity and gain of the beam pattern formed from the conductive pattern 510.

Figure 12A:
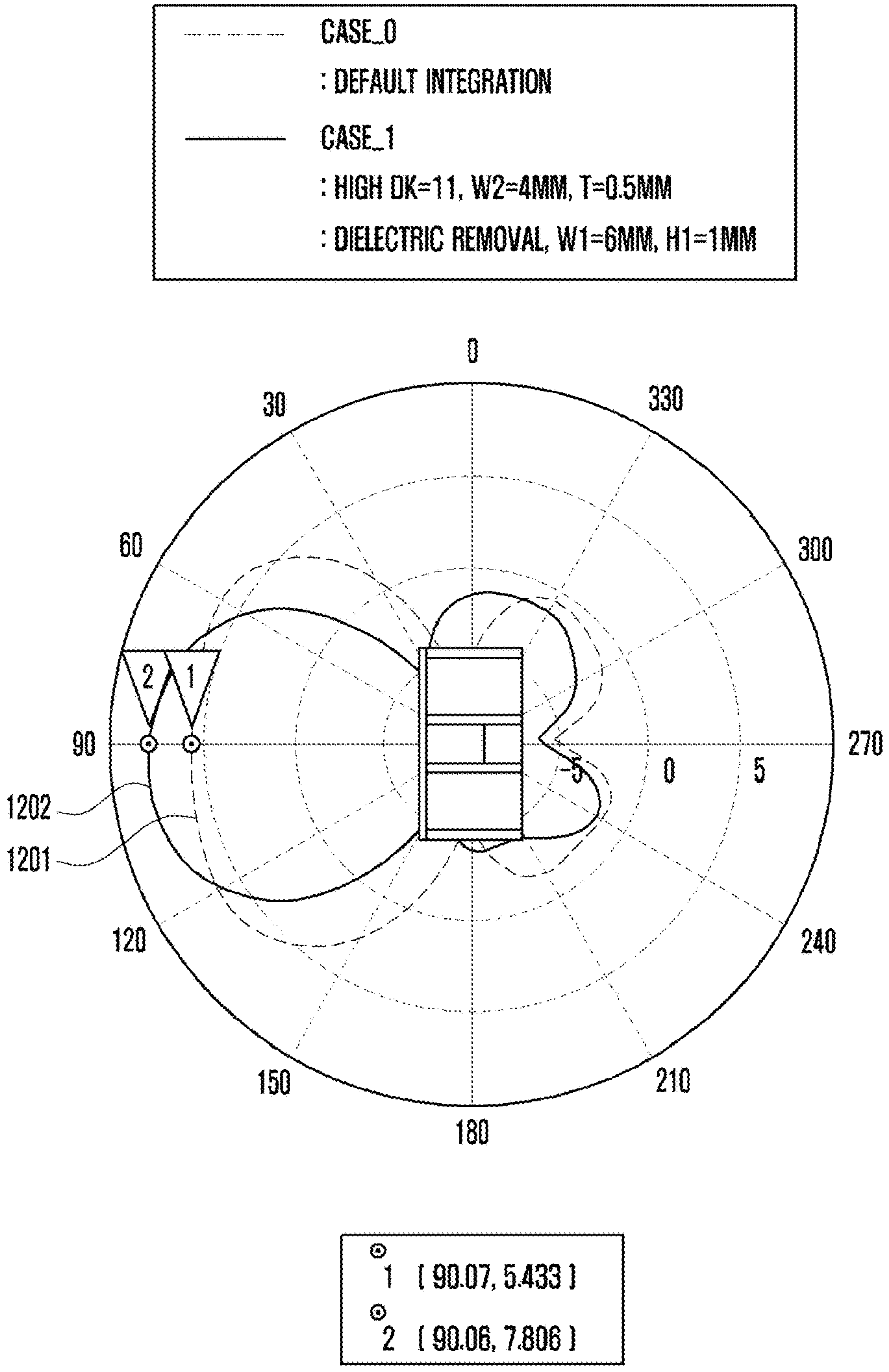
FIGS. 12A and 12B are diagrams comparing radiation patterns of an antenna structure shown in FIG. 11 and of a typical antenna structure on XY-plane and YZ-plane, respectively according to various embodiments of the disclosure.
Figure 12B:
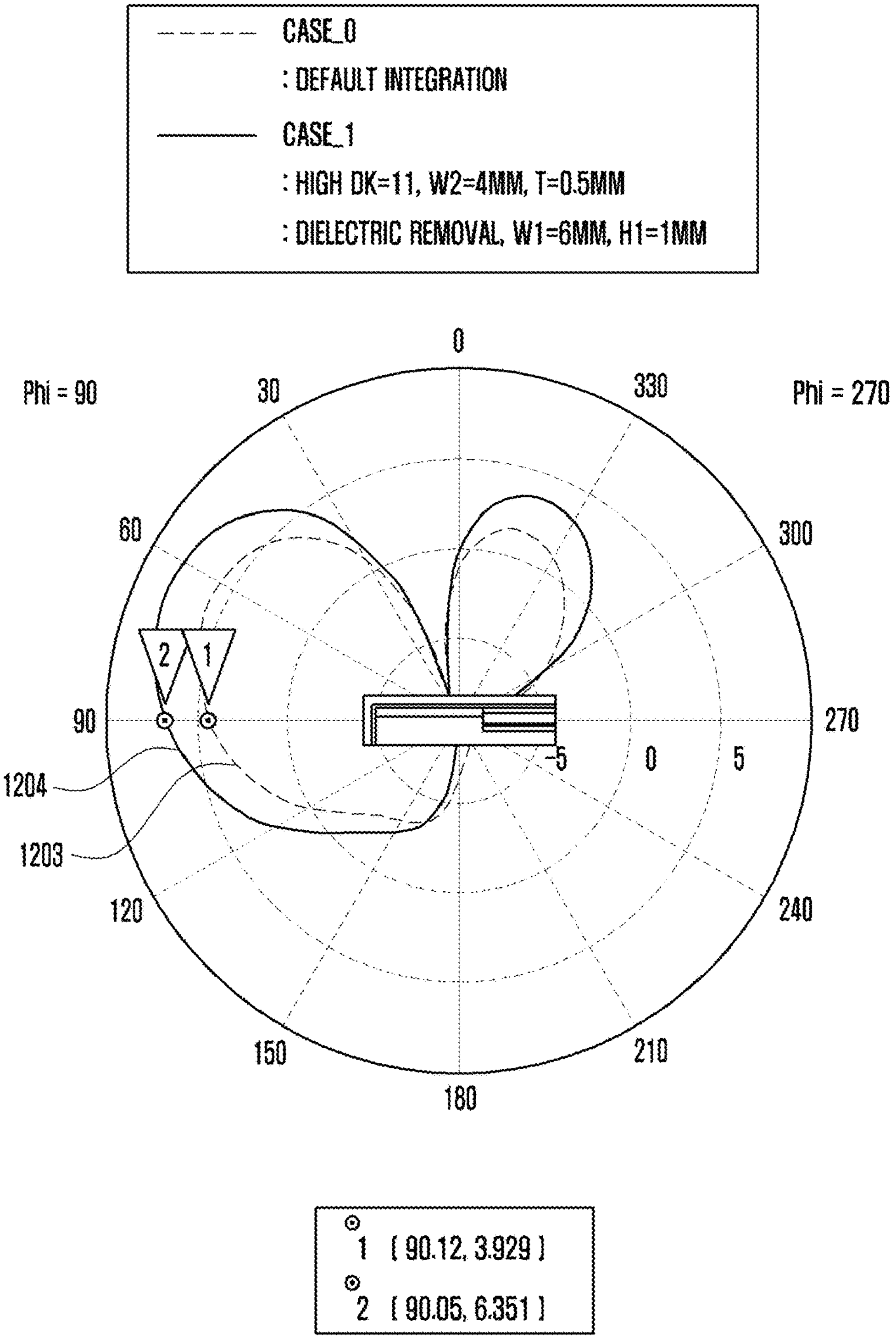

FIGS. 12A and 12B are diagrams comparing radiation patterns of an antenna structure shown in FIG. 11 and of a typical antenna structure on XY-plane and YZ-plane, respectively.

FIGS. 12A and 12B show, on XY-plane and YZ-plane, radiation strength in the 25 GHz band when the thickness (t) and width (w2) of the high-dielectric injected portion 671 having a dielectric constant of 11 are set to 0.5 mm and 4 mm, respectively, and the width (w1) and depth (h1) of each recess 662, 663 are set to 6 mm and 1 mm, respectively according to various embodiment of the disclosure.

Referring to FIG. 12A, on the XY-plane, the gain is about 5.4 dBi in case of a typical antenna structure having neither high-dielectric injected portion nor recess (1201 graph), and is about 7.8 dBi in case of the antenna structure 500 having both the high-dielectric injected portion 671 and the recesses 662 and 663 respectively set as above (1202 graph). That is, the gain increases by about 2.4 dBi. Accordingly, it can be seen that the antenna structure 500, to which both the high-dielectric injected portion 671 and the recesses 662 and 663 are applied, has excellent beam focusing performance in a lateral direction (e.g., the third direction denoted by ③ in FIG. 11).

Referring to FIG. 12B, on the YZ-plane, the gain is about 3.9 dBi in case of a typical antenna structure having neither high-dielectric injected portion nor recess (1203 graph), and is about 6.3 dBi in case of the antenna structure 500 having both the high-dielectric injected portion 671 and the recesses 662 and 663 respectively set as above (1204 graph). That is, the gain increases by about 2.4 dBi.

Figure 13:
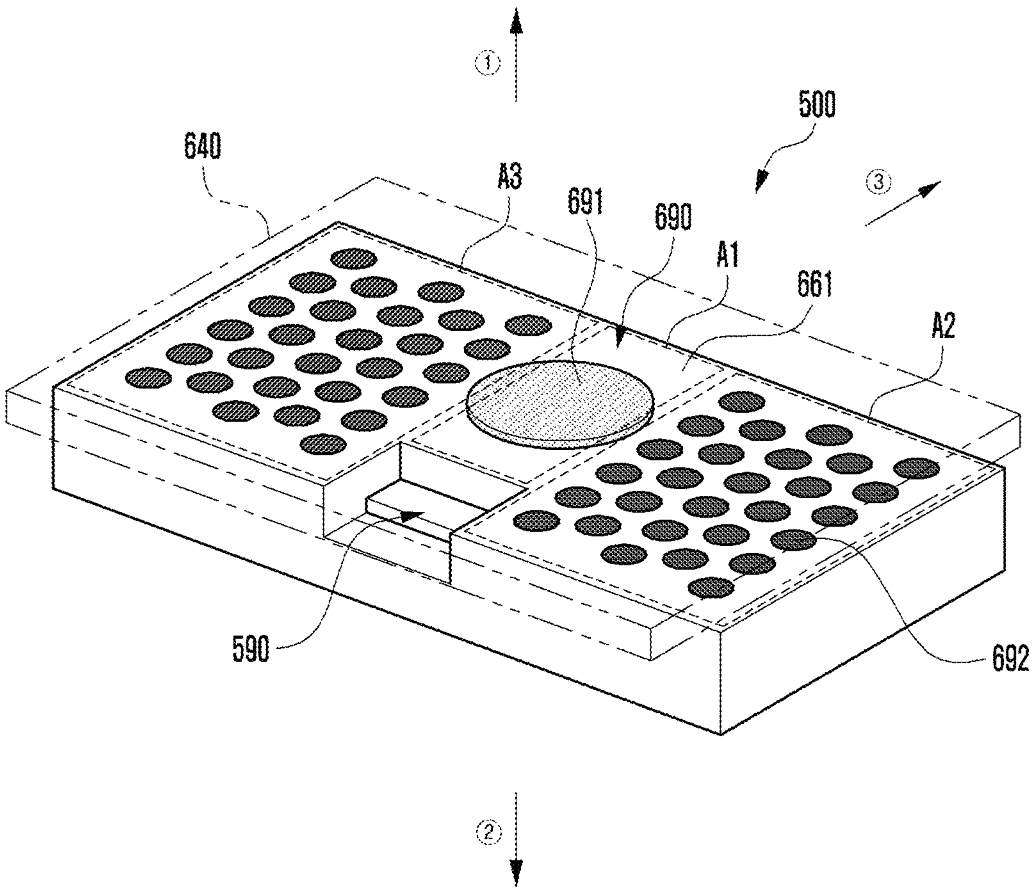
FIG. 13 is a perspective view illustrating an antenna structure according to an embodiments of the disclosure.

FIG. 13 is a perspective view illustrating an antenna structure according to an embodiment of the disclosure.

The antenna structure 500 shown in FIG. 13 may have the substantially same areas A1, A2, and A3 as those of the above-described antenna structures (i.e., the antenna structures 500 in FIGS. 7, 9, and 11). Embodiments described below relate to various structures capable of changing at least in part the dielectric constants of such areas.

Referring to FIG. 13, the antenna structure 500 may include the PCB 590 and a dielectric structure 690 disposed near the PCB 590 or disposed such that the PCB 590 is mounted at least in part. According to an embodiment, the dielectric structure 690 may include the first area A1 corresponding to the PCB 590 and disposed on the radiation path of the beam pattern formed from the conductive pattern (e.g., the conductive pattern 510 in FIG. 5), the second area A2 adjacent to one side of the first area A1, and the third area A3 adjacent to the other side of the first area A1. According to an embodiment, the first area A1 may be formed on the radiation path of the beam pattern formed from the conductive pattern 510 between the PCB 590 and the lateral member (e.g., the lateral member 620 in FIG. 6).

According to various embodiments, the first area A1 may include at least one high-dielectric patch 691 disposed to have a relatively high dielectric constant. Through the high-dielectric patch 691 having a relatively high dielectric constant, the first area A1 may be formed to have a dielectric constant higher than the dielectric constants of the second and third areas A2 and A3. According to an embodiment, when the first, second, and third areas A1, A2, and A3 of the dielectric structure 690 are formed (e.g., injected) to have the same dielectric constant, the high-dielectric patch 691 may be disposed in the first area A1 only such that the first area A1 has a dielectric constant higher than those of the second and third areas A2 and A3. In another embodiment, the high-dielectric patch 691 may be replaced with the high-dielectric injected portion 671 previously described in FIG. 11. The first area A1 having a relatively high dielectric constant may be disposed between the dielectric structure 690 and the rear cover 640 both having relatively low dielectric constants in the first direction (denoted by ①).

According to various embodiments, the dielectric structure 690 may include periodic structures 692 disposed in the second area A2 and the third area A3 in order to achieve a relatively low dielectric constant than that of the first area A1. According to an embodiment, the periodic structures 692 may be formed to penetrate the dielectric structure 690 in the second direction (denoted by ②). In another embodiment, the periodic structures 692 may be formed to have a certain depth from the upper surface 661 of the dielectric structure 690 in the second direction (②). In an embodiment, the periodic structures 692 may be formed in a circular shape. In another embodiment, the periodic structures 692 may be formed in any other shape such as an elliptical shape or a polygonal shape. In an embodiment, the periodic structures 692 may be formed as air holes containing no filling material. In another embodiment, the periodic structures 692 may be formed as air holes that contain a filling material having a dielectric constant lower than that of the first area A1. According to an embodiment, the periodic structures 692 may be periodically arranged along radiation directions from left and right ends of the PCB 590, except for the beam pattern direction of the first area A1, in the second and third areas A2 and A3. In an embodiment, the first area A1 having a relatively high dielectric constant may be disposed vertically in the first direction (denoted by ①) under the rear cover 640 having a relatively low dielectric constant, and also disposed horizontally between the second and third areas A2 and A3 both having relatively low dielectric constants because of the periodic structures 692, so that the antenna structure 500 can increase the directivity and gain of the beam pattern formed from the conductive pattern 510.

Figure 14:
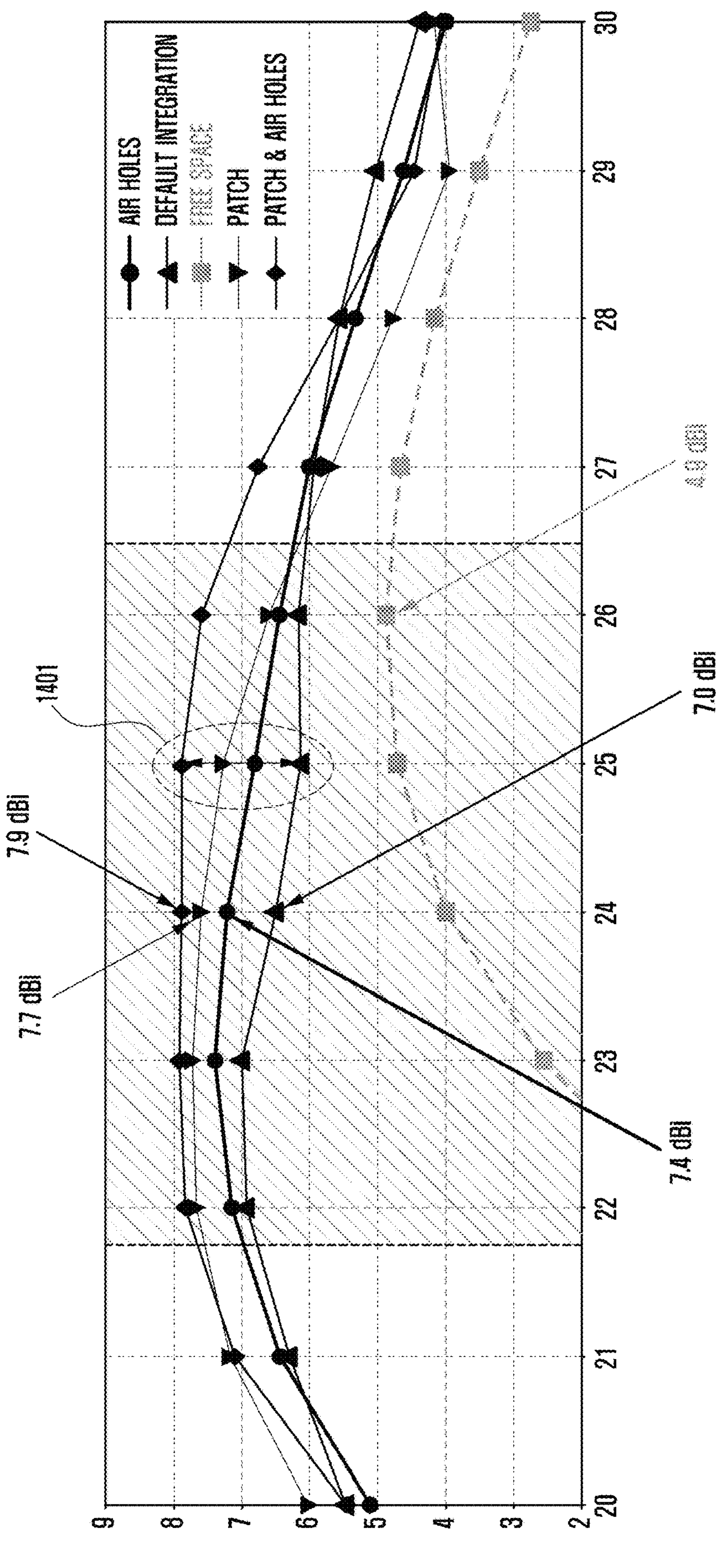
FIG. 14 is a graph comparing gain characteristics depending on a presence or absence of a high-dielectric patch and periodic structures of an antenna structure of FIG. 13 according to an embodiment of the disclosure.

FIG. 14 is a graph comparing gain characteristics depending on a presence or absence of a high-dielectric patch and periodic structures of an antenna structure of FIG. 13 according to an embodiment of the disclosure.

FIG. 14 shows gain characteristics of the antenna structure in case where neither high-dielectric patch nor the periodic structures are present (denoted by 'default integration'), in case where only the periodic structures 692 are formed (denoted by 'air holes'), in case where only the high-dielectric patch 691 is disposed (denoted by 'patch'), and in case where both the periodic structures 692 and the high-dielectric patch 691 are applied (denoted by 'patch & air holes').

Referring to FIG. 14, in the 25 GHz band (denoted by 1401), the antenna structure 500 with only the periodic structures 692 has a gain increased by about 0.4 dB in comparison with the default antenna structure, and the gain bandwidth is also increased. In an embodiment, the antenna structure 500 with only the high-dielectric patch 691 has a gain increased by about 0.7 dB in comparison with the default antenna structure, and the gain bandwidth is also increased. In an embodiment, the antenna structure with both high-dielectric patch 691 and the periodic structures 692 has a gain increased by about 0.9 dB in comparison with the default antenna structure. That is, it can be seen that, in the 25 GHz, there is a gain increase effect up to 2 dB. Also, it can be seen that the antenna structure 500 to which both the high-dielectric patch 691 and the periodic structures 692 are applied together has substantially uniform gain characteristics within an operating frequency band of about 22 GHz to about 26.5 GHz.

Figure 15:
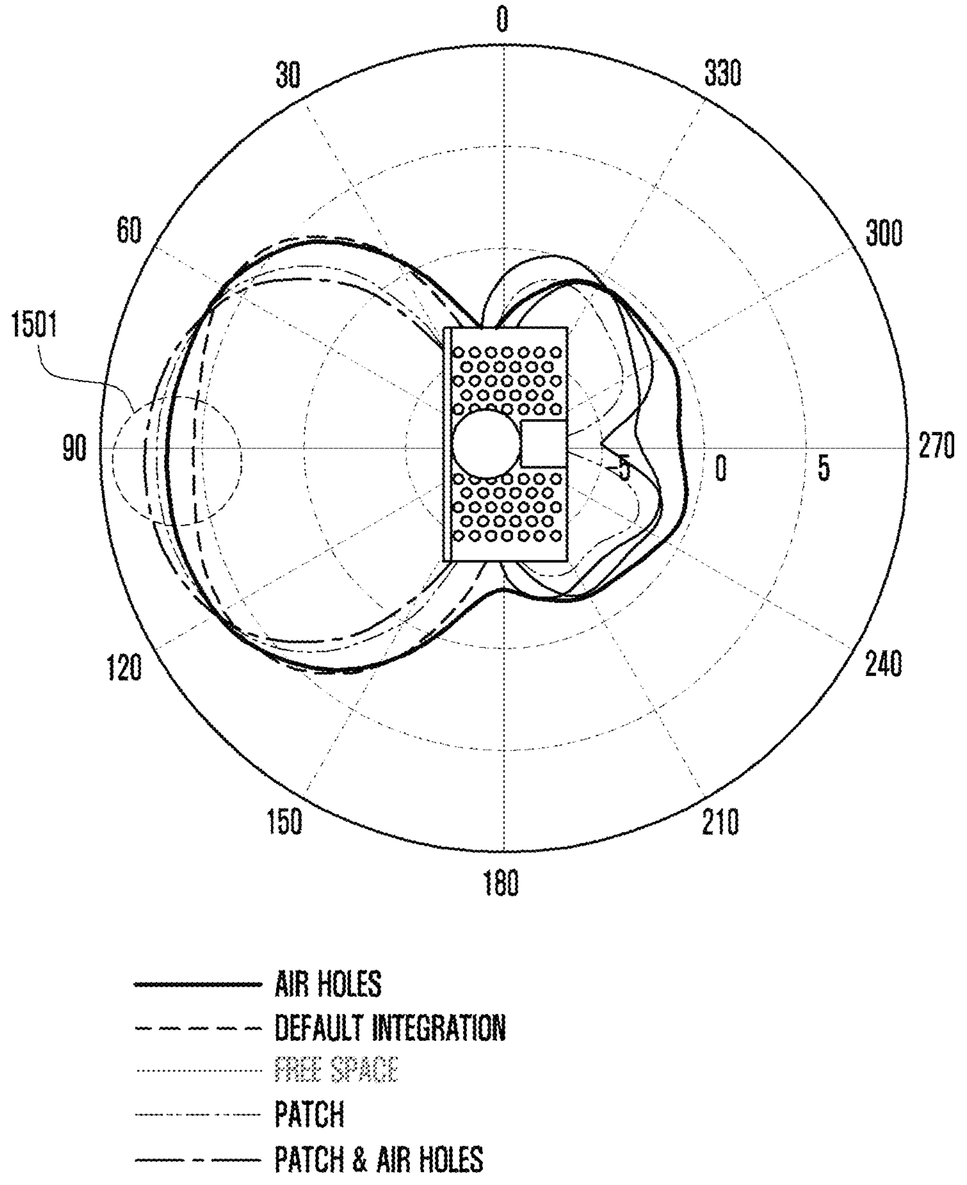
FIG. 15 is a diagram comparing radiation characteristics depending on a presence or absence of a high-dielectric patch and periodic structures of an antenna structure of FIG. 13 according to an embodiment of the disclosure.

FIG. 15 is a diagram comparing radiation characteristics depending on a presence or absence of a high-dielectric patch and periodic structures of an antenna structure of FIG. 13 according to an embodiment of the disclosure.

Referring to FIG. 15, in the 25 GHz band (denoted by 1501), the antenna structure 500 to which both the high-dielectric patch 691 and the periodic structures 692 are applied has a beam focused in a lateral direction (e.g., the third direction denoted by ③ in FIG. 13), and also has a narrower half power beam width (HPWB) resulting in an improved directivity.

Figure 16A:
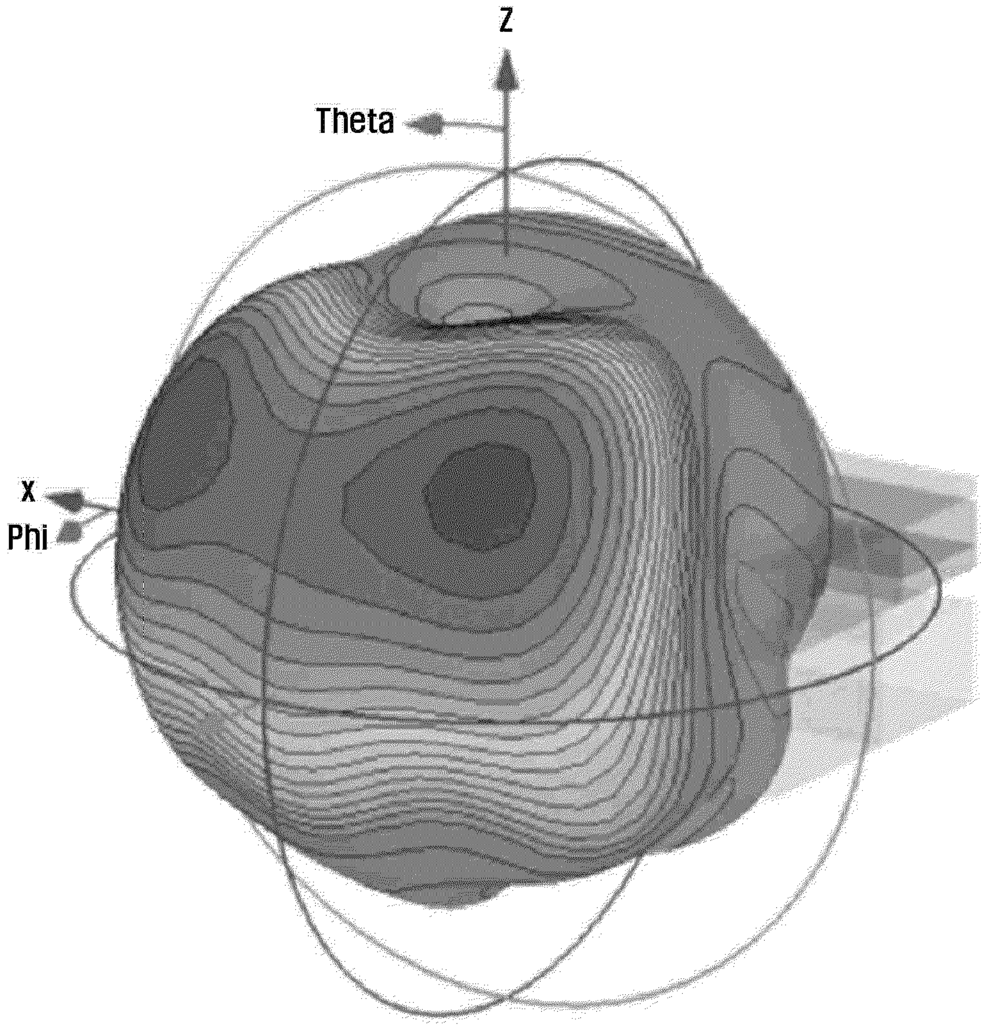
FIGS. 16A and 16B are diagrams comparing radiation patterns of an antenna structure shown in FIG. 13 and of a typical antenna structure according to various embodiments of the disclosure.
Figure 16B:
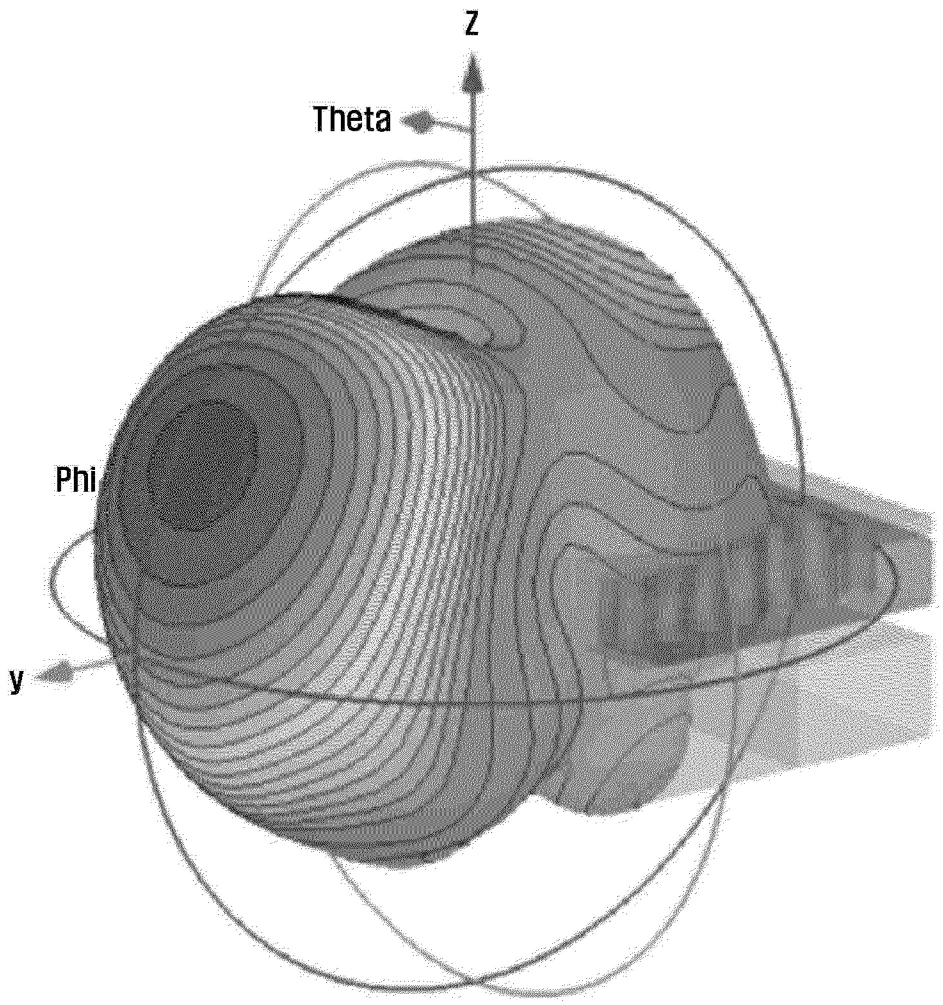

FIGS. 16A and 16B are diagrams comparing radiation patterns of an antenna structure shown in FIG. 13 and of a typical antenna structure according to various embodiments of the disclosure.

Referring to FIG. 16A, the typical antenna structure to which neither the high-dielectric patch 691 nor the periodic structures 692 are applied may cause the main beam to be divided into both sides, resulting in deterioration of directivity. In contrast, referring to FIG. 16B, the antenna structure 500 to which both the high-dielectric patch 691 and the periodic structures 692 are applied according to an embodiment may allow the main beam to be focused, thereby maintaining high gain characteristics.

Figure 17A:
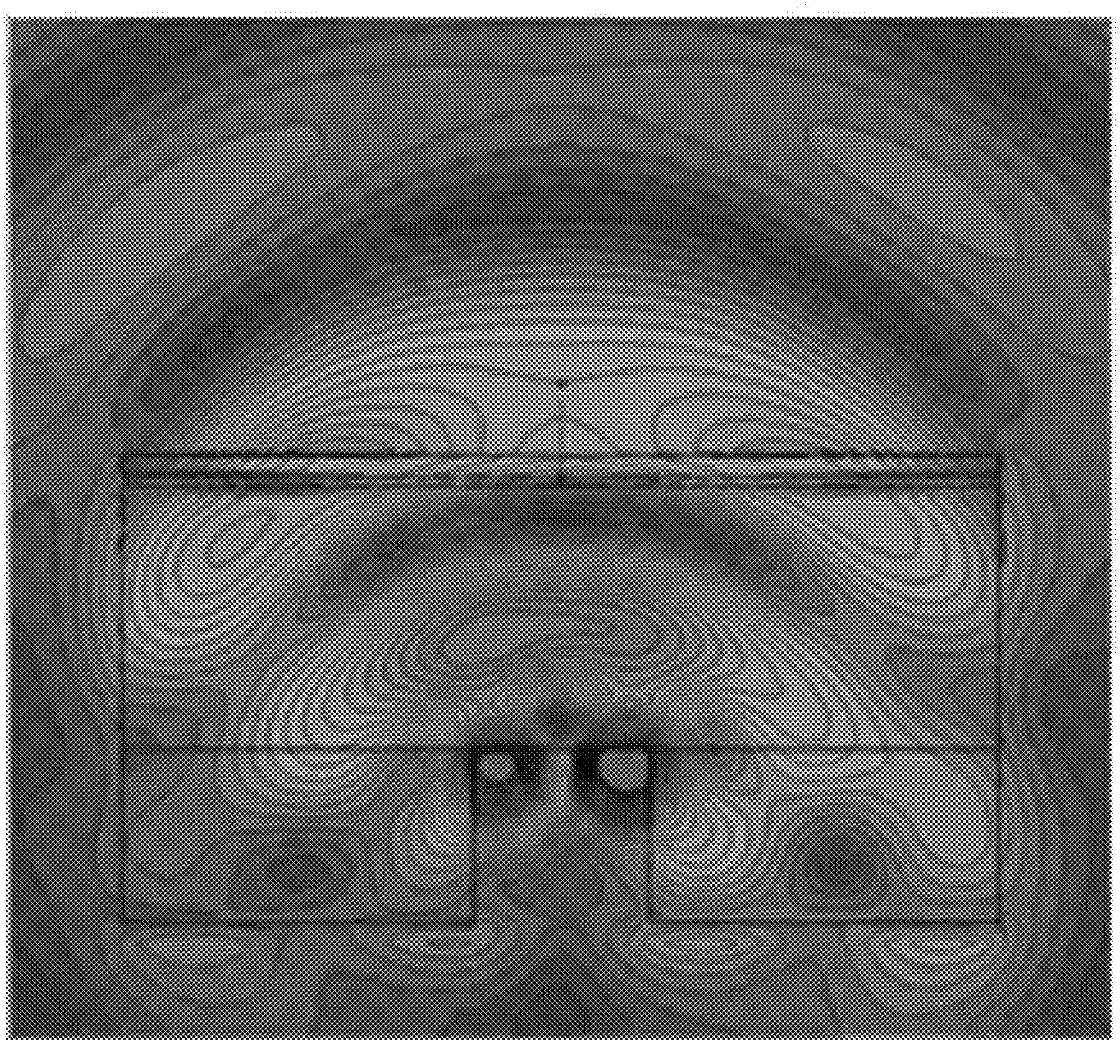
FIGS. 17A and 17B are diagrams illustrating, on XY plane, electric field distributions of an antenna structure shown in FIG. 13 and of a typical antenna structure according to various embodiments of the disclosure.
Figure 17B:
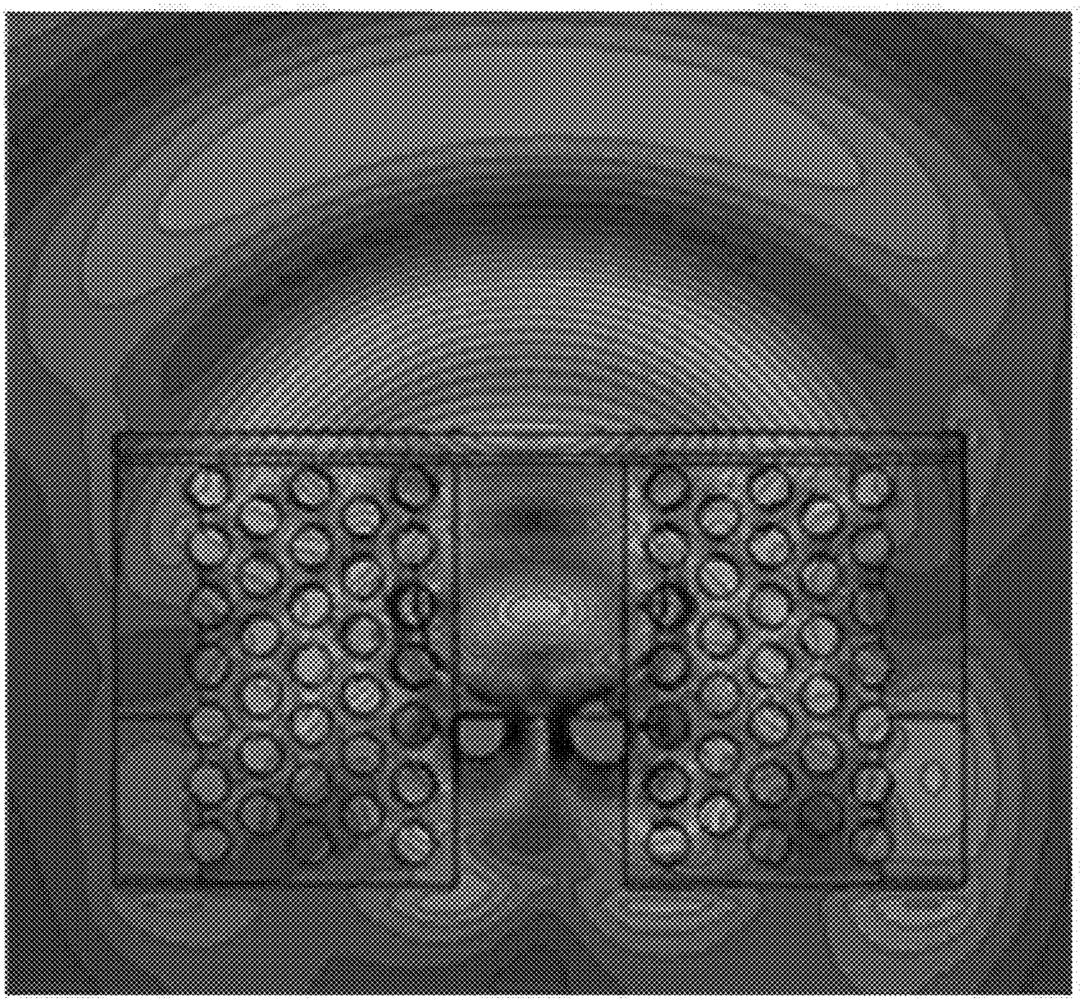

FIGS. 17A and 17B are diagrams illustrating, on an XY plane, electric field distributions of an antenna structure shown in FIG. 13 and of a typical antenna structure according to various embodiments of the disclosure.

Referring to FIG. 17A, the typical antenna structure to which neither the high-dielectric patch 691 nor the periodic structures 692 are applied has an electric field distribution that indicates a lateral radiation widely spread left and right. In contrast, referring to FIG. 17B, the antenna structure 500 to which both the high-dielectric patch 691 and the periodic structures 692 are applied according to an embodiment has an electric field distribution that indicates a reduced lateral radiation and a radiation guided to the outermost side of the electronic device.

Figure 18A:
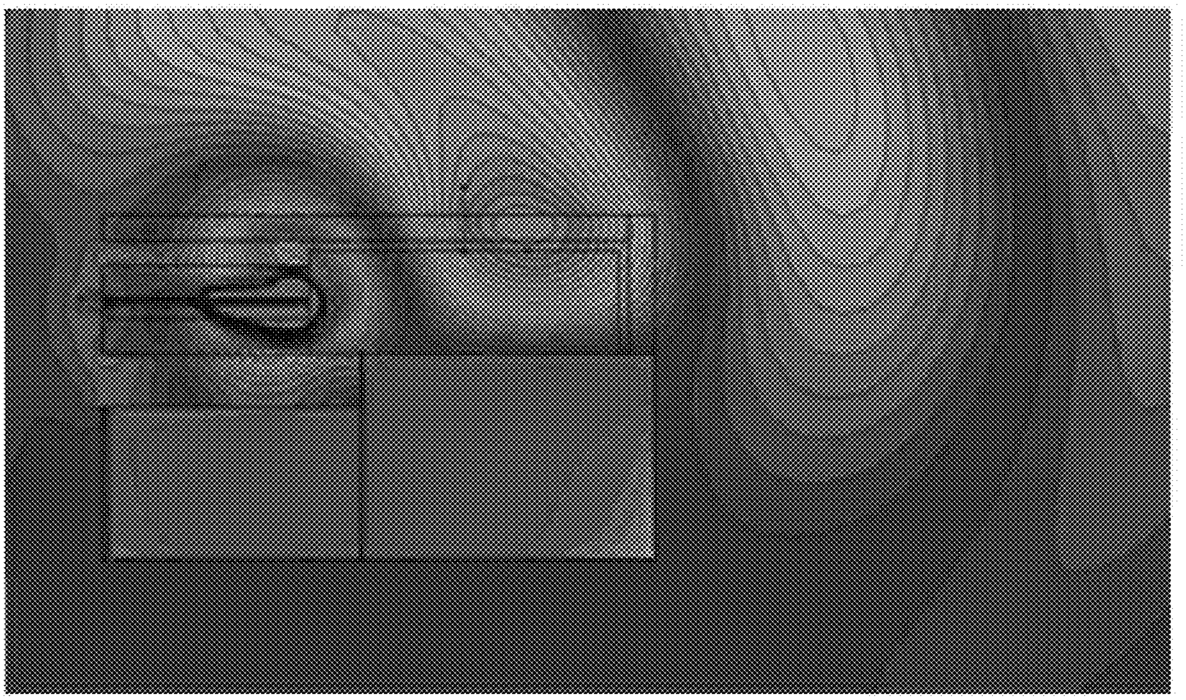
FIGS. 18A and 18B are diagrams illustrating, on YX plane, electric field distributions of an antenna structure shown in FIG. 13 and of a typical antenna structure according to various embodiments of the disclosure.
Figure 18B:
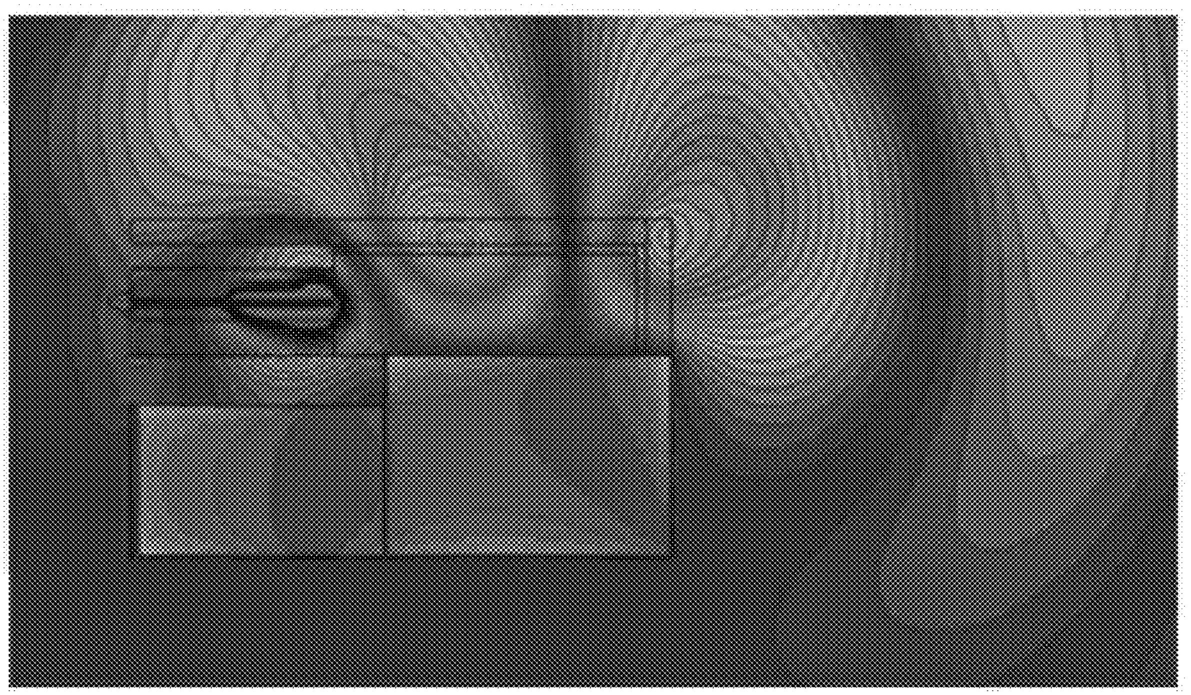

FIGS. 18A and 18B are diagrams illustrating, on an YX plane, electric field distributions of an antenna structure shown in FIG. 13 and of a typical antenna structure according to various embodiments of the disclosure.

Referring to FIG. 18A, the typical antenna structure to which neither the high-dielectric patch 691 nor the periodic structures 692 are applied has an electric field distribution that indicates a lateral radiation formed along the rear cover 640 but weak electric field strength at the outermost by beam splitting. In contrast, referring to FIG. 18B, the antenna structure 500 to which both the high-dielectric patch 691 and the periodic structures 692 are applied according to an embodiment has an electric field distribution that indicates the electric field strength guided to the outermost and also the radiation of the maximum power.

Figure 19:
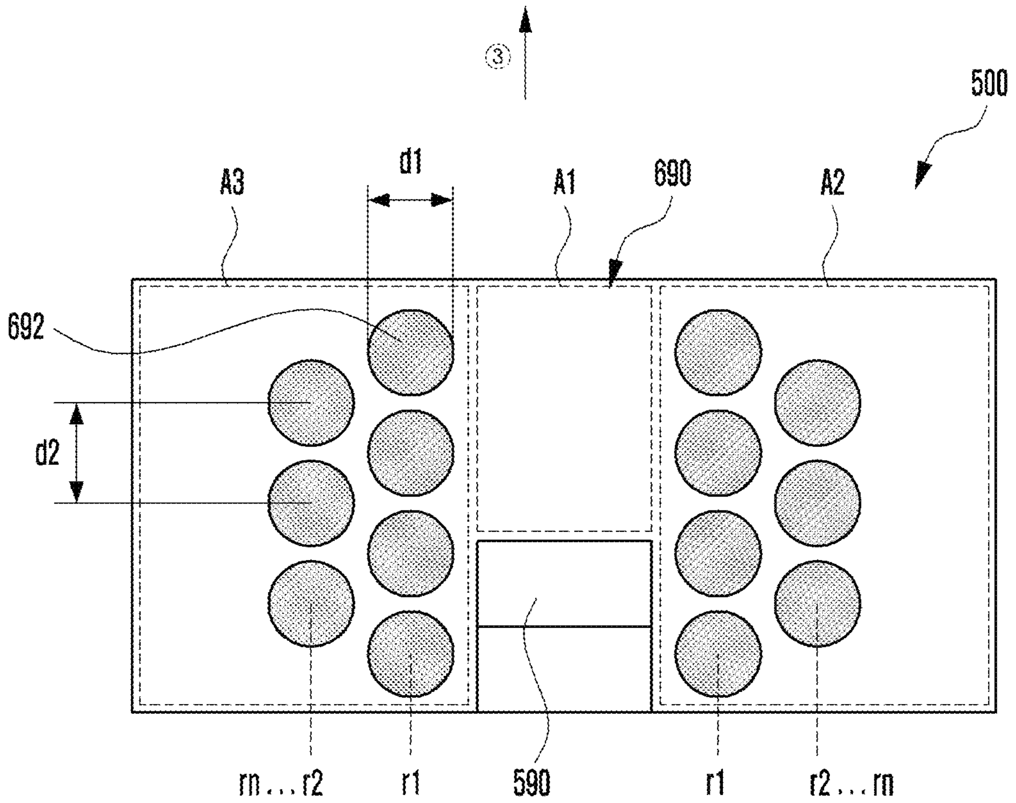
FIG. 19 is a diagram illustrating a configuration of periodic structures of an antenna structure according to an embodiment of the disclosure.

FIG. 19 is a diagram illustrating a configuration of periodic structures of an antenna structure according to an embodiment of the disclosure.

Referring to FIG. 19, based on the configuration of the periodic structures 692, the second and third areas A2 and A3 of the dielectric structure 690 may have effective dielectric constants lower than the dielectric constant of the first area A1. In an embodiment, the dielectric constant of each of the second and third areas A2 and A3 may be determined based on the diameter (d1) (i.e., size) of each periodic structure 692, the distance (d2) between adjacent periodic structures 692, and/or the number of arrangements (r1, r2, . . . , rn) of the periodic structures 692. For example, when the distance (d2) between the periodic structures 692 is decreased, when the diameter (d1) of each periodic structure 692 is increased, or when the number of arrangements (r1, r2, . . . , rn) of the periodic structures 692 is increased, the effective dielectric constant of each of the second and third areas A2 and A3 may be lowered. In another embodiment, if the arrangement density of the periodic structures 692 is increased, each of the second and third areas A2 and A3 may have a low effective dielectric constant.

Figure 20:
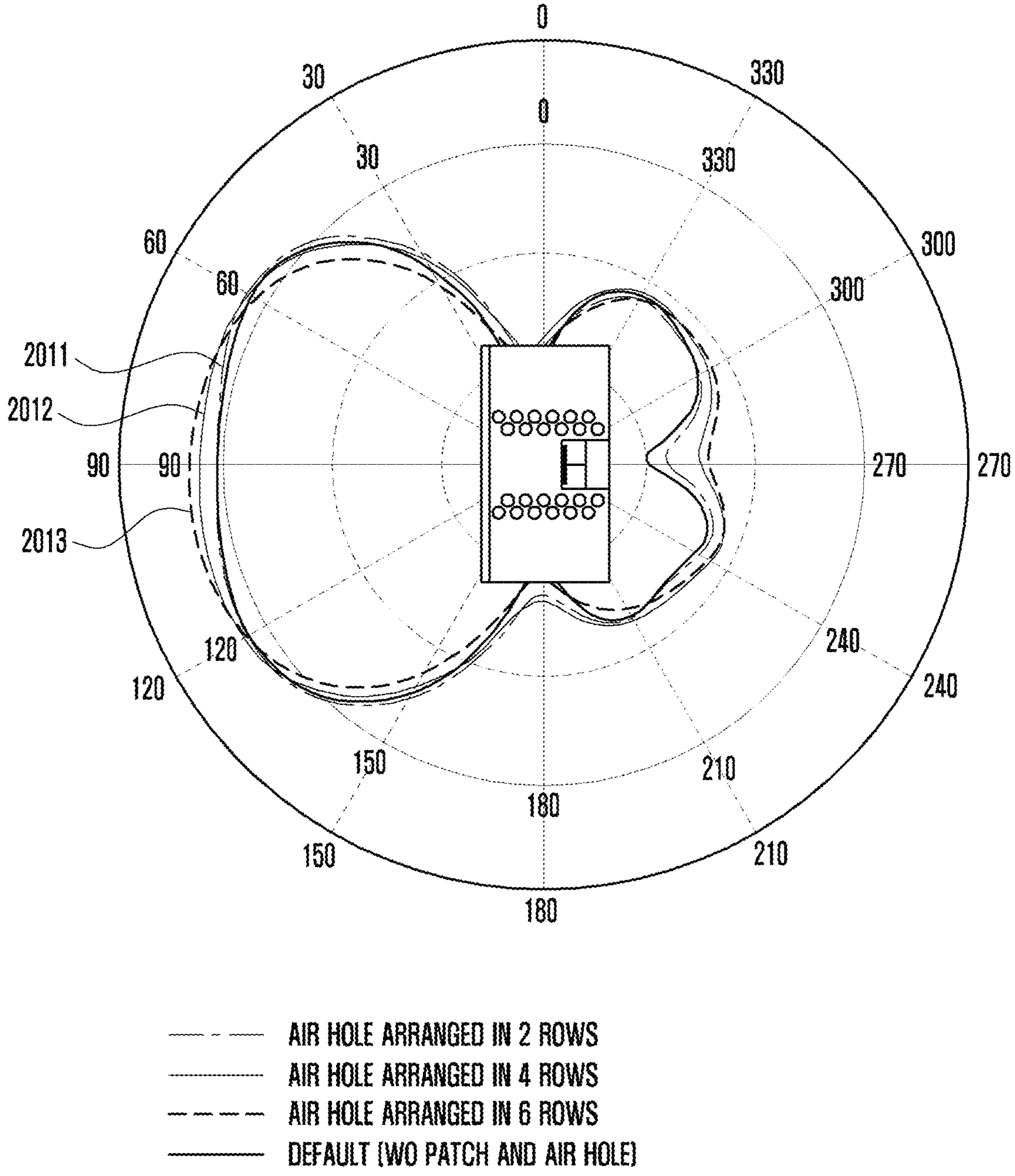
FIG. 20 is a diagram illustrating radiation characteristics depending on a number of arrangements of periodic structures shown in FIG. 19 according to an embodiment of the disclosure.

FIG. 20 is a diagram illustrating radiation characteristics depending on the number of arrangements (r1, r2, . . . , rn) of the periodic structures 692 shown in FIG. 19 according to an embodiment of the disclosure.

Referring to FIG. 20, it shows a variation of radiation patterns depending on the number of arrangements (r1, r2, . . . , rn) of the periodic structures 692, that is, shows the radiation patterns of the antenna structure 500 in case where, in each of the second and third areas A2 and A3, the periodic structures 692 are arranged in two rows (2011), in case arranged in four rows (2012), and in case arranged in six rows (2013). As illustrated, when two rows of periodic structures 692 are additionally arranged in the default antenna structure, the beam focusing effect may not be large. However, when four or more rows of the periodic structures 692 are arranged, the peak gain of the lateral radiation of the antenna structure 500 increases. That is, when four rows and six rows are arranged, the peak gains may be increased to 0.85 dB and 1.3 dB, respectively. This means that the effective dielectric constants of the second and third areas A2 and A3 become lowered only when four or more rows of the periodic structures 692 are applied.

Figure 21:
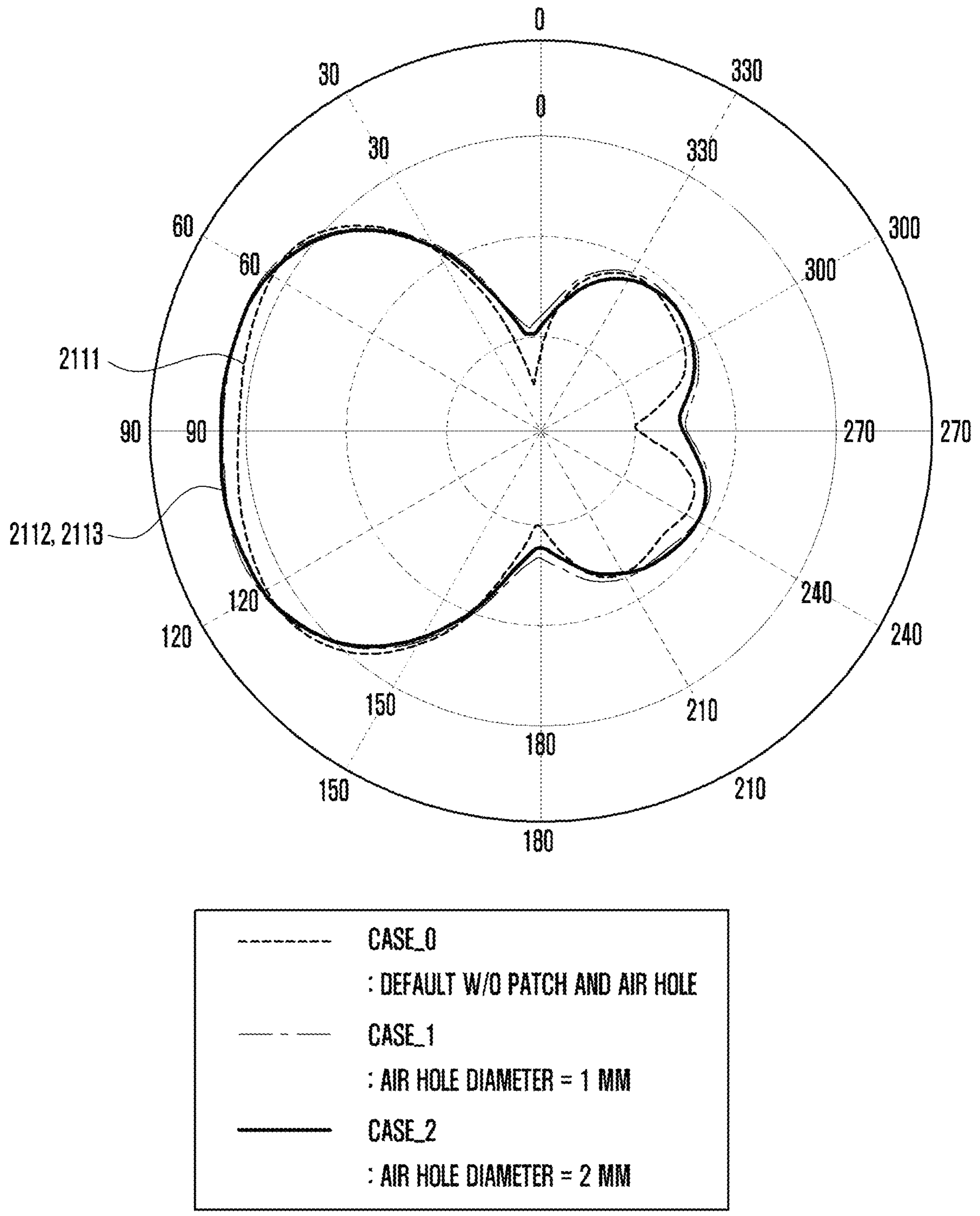
FIG. 21 is a diagram illustrating radiation characteristics depending on a diameter of periodic structures shown in FIG. 19 according to an embodiment of the disclosure.

FIG. 21 is a diagram illustrating radiation characteristics depending on a diameter (d1) of periodic structures shown in FIG. 19 according to various embodiment of the disclosure.

Referring to FIG. 21, it can be seen that the antenna structure 500 has an excellent beam focusing performance when the periodic structures 692 each having a diameter of 1 mm are arranged in four rows (2112 graph) than when there is no periodic structure (2111 graph). In addition, it can be seen that even when the periodic structures 692 each having a diameter of 2 mm are arranged in two rows (2113 graph), the antenna structure 500 has the substantially same beam focusing performance as when the periodic structures 692 each having a diameter of 1 mm are arranged in four rows (2112 graph). According to an embodiment, it can be seen that the effective dielectric constants of the second and third areas A2 and A3 are lowered in proportion to the area occupied by the periodic structures 692.

Figure 22:
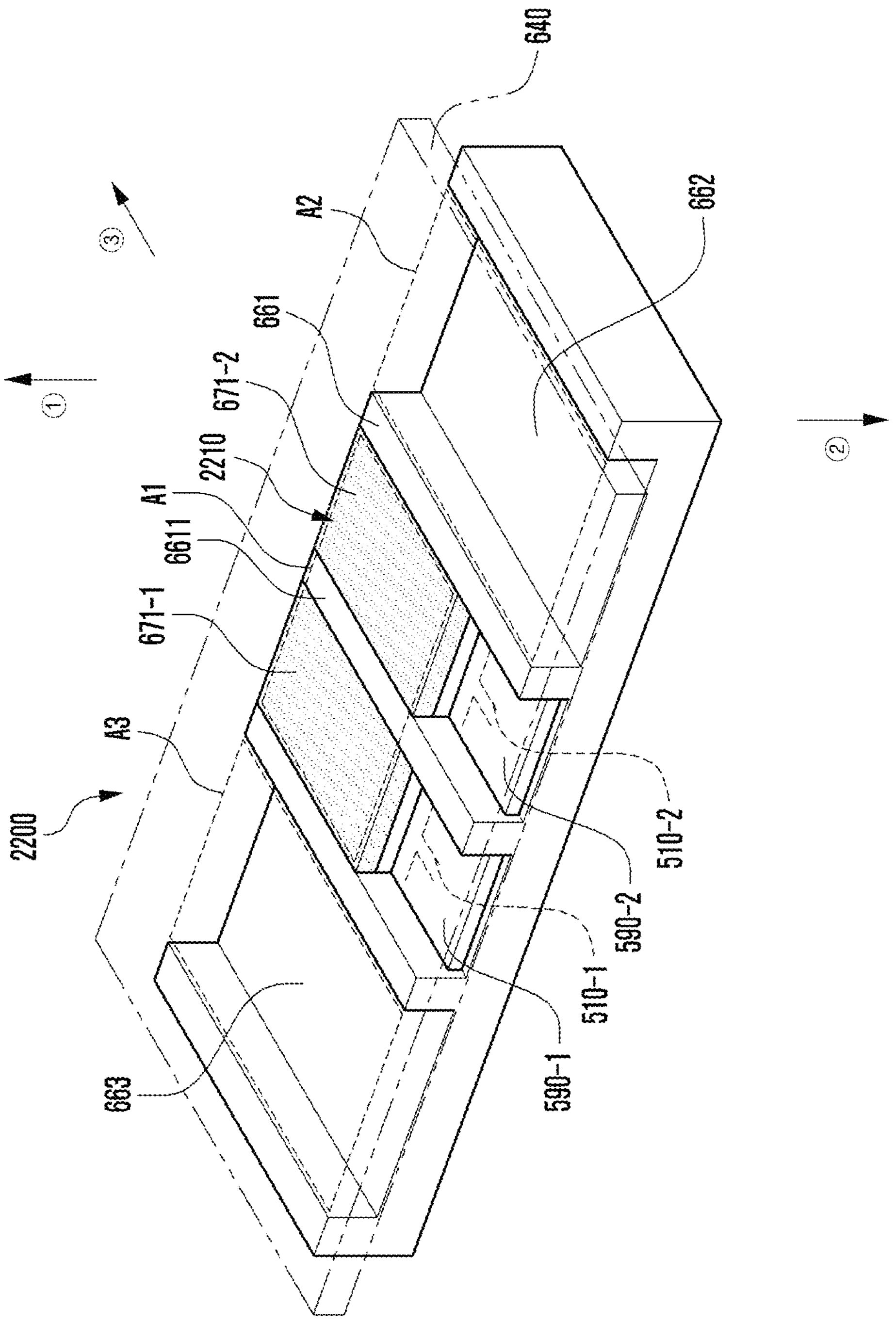
FIG. 22 is a perspective view illustrating an antenna structure according to an embodiment of the disclosure.

FIG. 22 is a perspective view illustrating an antenna structure according to an embodiment of the disclosure.

Referring to FIG. 22, in an antenna structure 2200, the same or similar components as those of the antenna structure 500 shown in FIG. 11 may be indicated by the same reference numerals, and related descriptions may be omitted.

The antenna structure 2200 may include a pair of PCBs 590-1 and 590-2, and a dielectric structure 2210 disposed near the pair of PCBs 590-1 and 590-2 or disposed such that the pair of PCBs 590-1 and 590-2 are mounted at least in part. According to an embodiment, the pair of PCBs may include first and second PCBs 590-1 and 590-2 including first and second conductive patterns 510-1 and 510-2, respectively, as dipole antennas. According to an embodiment, the dielectric structure 2210 may include the first area A1 corresponding to the pair of PCBs 590-1 and 590-2 and disposed on the radiation path of the beam patterns formed from the conductive patterns 510-1 and 510-2, the second area A2 adjacent to one side of the first area A1, and the third area A3 adjacent to the other side of the first area A1. According to an embodiment, between the PCBs 590-1 and 590-2 and the lateral member (e.g., the lateral member 620 in FIG. 6), the first area A1 may encompass the radiation path of the beam patterns formed from the conductive patterns 510-1 and 510-2. According to an embodiment, the first and second PCBs 590-1 and 590-2 may be physically separated from each other through a partition wall 6611 in the first area A1. According to an embodiment, the pair of conductive patterns 510-1 and 510-2 may be arranged at half-wavelength intervals.

According to various embodiments, through a plurality of high-dielectric injected portions 671-1 and 671-2 each disposed to have a relatively high dielectric constant, the first area A1 may be formed to have a dielectric constant higher than dielectric constants of the second and third areas A2 and A3. According to an embodiment, the plurality of high-dielectric injected portions 671-1 and 671-2 may include a first high-dielectric injected portion 671-1 disposed to face the first PCB 590-1 in the first area A1, and a second high-dielectric injected portion 671-2 disposed to face the second PCB 590-2 in the first area A1. In another embodiment, the first area A1 may contain, without the partition wall 6611, a single high-dielectric injected portion corresponding to both the first and second high-dielectric injected portions.

According to various embodiments, each of the second and third areas A2 and A3 may be formed to have a dielectric constant lower than the dielectric constant of the first area A1 through the recesses 662 and 663 formed lower than the surface 661 of the dielectric structure 680 facing the first direction (denoted by ①). Thus, the first area A1 having a relatively high dielectric constant may be disposed vertically between the dielectric structure 2210 and the rear cover 640 both having relatively low dielectric constants in the first direction (denoted by ①), and also disposed horizontally between the second and third areas A2 and A3 both having relatively low dielectric constants and having the recesses 662 and 663. It is therefore possible to increase the directivity and gain of the beam patterns formed from the conductive patterns 510-1 and 510-2.

Figure 23A:
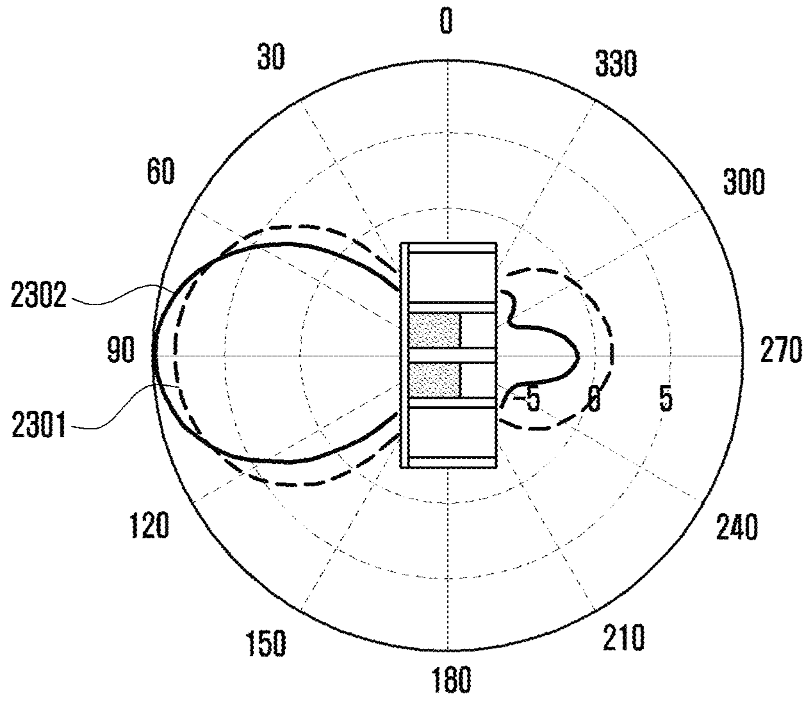
FIGS. 23A and 23B are diagrams comparing radiation patterns of an antenna structure shown in FIG. 22 and of a typical antenna structure on XY-plane and YZ-plane, respectively according to various embodiments of the disclosure.
Figure 23B:
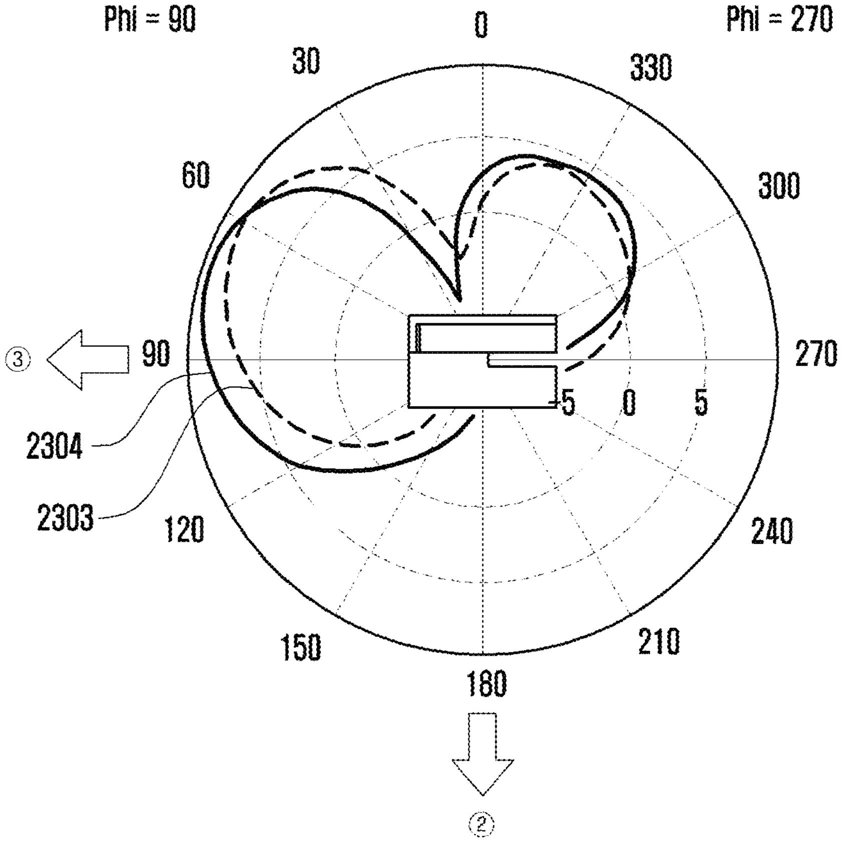

FIGS. 23A and 23B are diagrams comparing radiation patterns of an antenna structure shown in FIG. 22 and of a typical antenna structure on an XY-plane and a YZ-plane, respectively according to various embodiments of the disclosure.

FIGS. 23A and 23B show, on XY-plane and YZ-plane, radiation strength of the antenna structure 2200 in the 25 GHz band.

Referring to FIG. 23A, on an XY-plane, the gain is about 8.5 dBi in case of a typical antenna structure having neither high-dielectric injected portion nor recess (2301 graph), and is about 9.8 dBi in case of the antenna structure 2200 having both the high-dielectric injected portions 671-1 and 671-2 and the recesses 662 and 663 (2302 graph). That is, the gain increases by about 1.3 dBi. Accordingly, it can be seen that the antenna structure 220, to which the high-dielectric injected portions 671-1 and 671-2 and the recesses 662 and 663 are applied together, has excellent beam focusing performance in a lateral direction (e.g., the third direction denoted by ③ in FIG. 22).

Referring to FIG. 23B, at 90 degrees (i.e., in the third direction ③ or in a direction of the lateral member) on the YZ-plane, the gain is about 6.6 dBi in case of a typical antenna structure having neither high-dielectric injected portion nor recess (2303 graph), and is about 8.6 dBi in case of the antenna structure 2200 having both the high-dielectric injected portions 671-1 and 671-2 and the recesses 662 and 663 (2304 graph). That is, the gain increases by about 2.0 dBi. In addition, at 120 degrees (i.e., in the second direction ② or in a direction of the front cover) on the YZ-plane, the gain is about 1.5 dBi in case of a typical antenna structure having neither high-dielectric injected portion nor recess (2303 graph), and is about 4.3 dBi in case of the antenna structure 2200 having both the high-dielectric injected portions 671-1 and 671-2 and the recesses 662 and 663 (2304 graph). That is, the gain increases by about 2.8 dBi.

Figure 24:
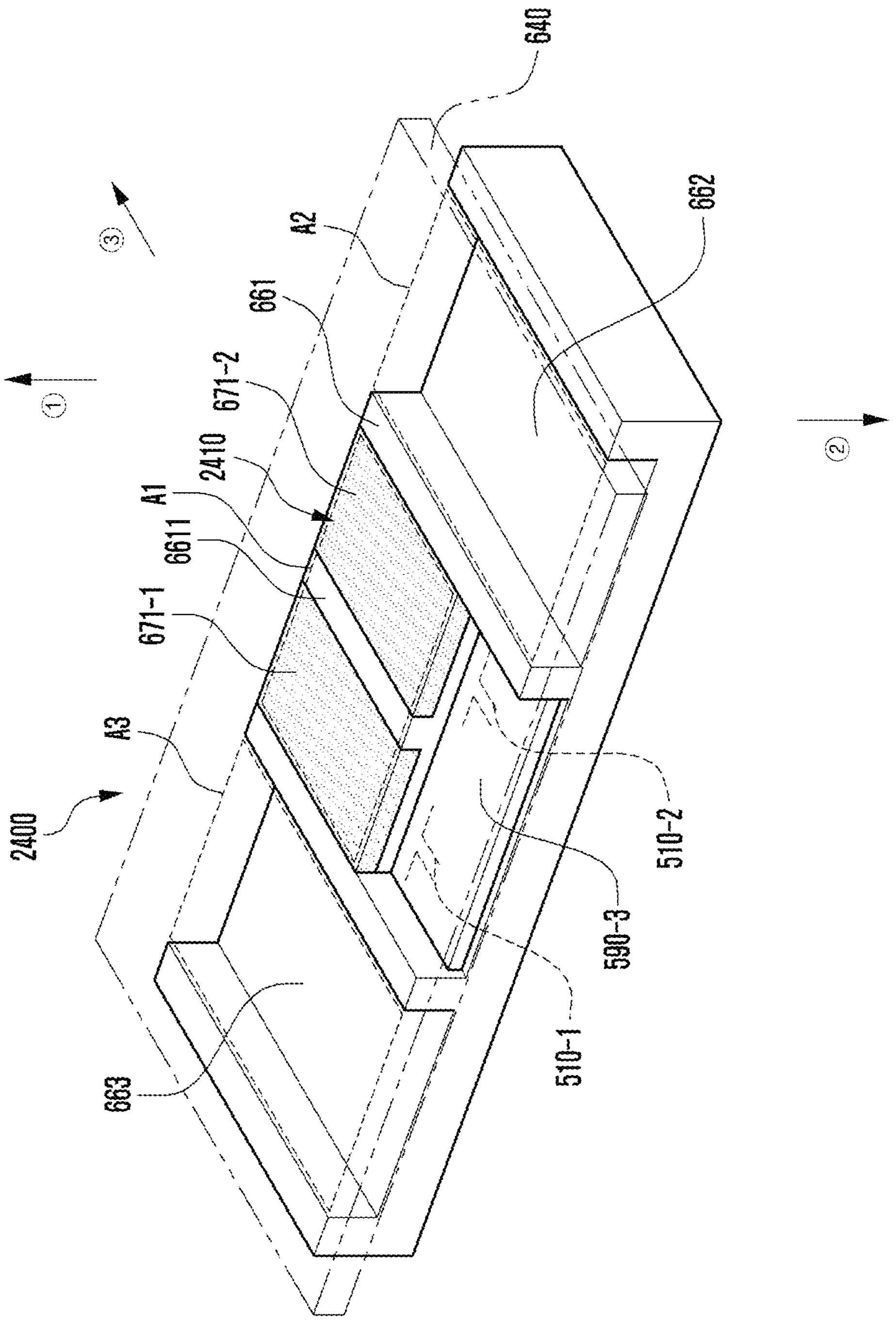
FIG. 24 is a perspective view illustrating an antenna structure according to an embodiment of the disclosure.

FIG. 24 is a perspective view illustrating an antenna structure according to an embodiment of the disclosure.

Referring to FIG. 24, in an antenna structure 2400 shown in FIG. 24, the same or similar components as those of the antenna structure 2200 shown in FIG. 22 may be indicated by the same reference numerals, and related descriptions may be omitted.

The antenna structure 2400 may include the plurality of (e.g., first and second) high-dielectric injected portions 671-1 and 671-2 separated from each other through the partition wall 6611 in the first area A1 of a dielectric structure 2410. According to an embodiment, the antenna structure 2400 may include a single PCB 590-3 disposed to face the first area A1 of the dielectric structure 2410 and also face the plurality of high-dielectric injected portions 671-1 and 671-2 in common. According to an embodiment, the antenna structure 2400 may include the pair of conductive patterns 510-1 and 510-2 disposed on or in the PCB 590-3 to face the first and second high-dielectric injected portions 671-1 and 671-2, respectively.

Figure 25:
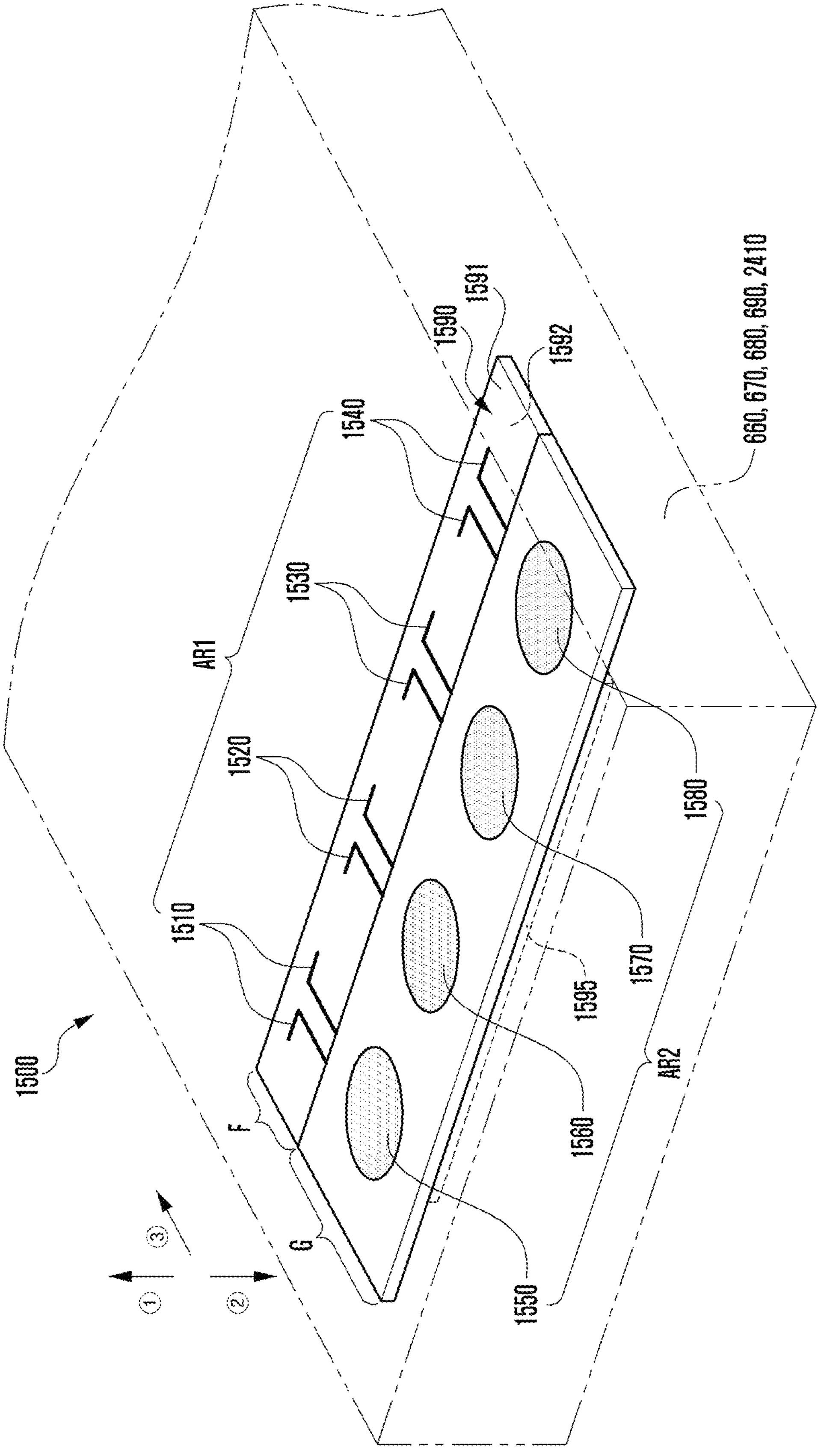
FIG. 25 is a perspective view illustrating an antenna structure according to an embodiment of the disclosure.

FIG. 25 is a perspective view illustrating an antenna structure according to an embodiment of the disclosure.

Referring to FIG. 25, an antenna module including the antenna structure 1500 and a wireless communication circuit 1595, shown in FIG. 25, may be similar, at least in part, to the third antenna module 246 of FIG. 2, or may include other embodiments of the antenna module.

The antenna structure 1500 may include a PCB 1590, a first antenna array AR1 disposed on or in the PCB 1590, a second antenna array AR2 disposed near the first antenna array AR1 on or in the PCB 1590, and/or a dielectric structure (e.g., the dielectric structure 660 in FIG. 7, 670 in FIG. 9, 680 in FIG. 11, 690 in FIG. 13, or 2410 in FIG. 24) disposed near the PCB 1590 or disposed to support the PCB 1590 at least in part.

According to various embodiments, the PCB 1590 may have a first surface 1591 facing a first direction (denoted by ①) and a second surface 1592 facing a second direction (denoted by ②) opposite to the first direction. According to an embodiment, the first antenna array AR1 may include a plurality of conductive patterns 1510, 1520, 1530, and 1540 disposed at regular intervals in an inner space between the first surface 1591 and the second surface 1592 of the PCB 1590. According to an embodiment, the first antenna array AR1 may be disposed in the fill-and-cut region F of the PCB 1590 that contains a dielectric layer. According to an embodiment, the second antenna array AR2 may include a plurality of conductive patches 1550, 1560, 1570, and 1580 exposed on the first surface 1591 of the PCB 1590 or disposed near the first surface 1591 in an inner space between the first and second surfaces 1591 and 1592. According to an embodiment, the second antenna array AR2 may be disposed in the ground region G of the PCB 1590 that contains a ground layer and adjoins the fill-and-cut region F. According to an embodiment, the plurality of conductive patterns 1510, 1520, 1530, and 1540 may operate as a dipole antenna. According to an embodiment, the plurality of conductive patches 1550, 1560, 1570, and 1580 may operate as a patch antenna.

According to various embodiments, the wireless communication circuit 1595 may be mounted on the second surface 1592 and electrically connected to both the first antenna array AR1 and the second antenna array AR2. In another embodiment, the wireless communication circuit 1595 may be disposed in the inner space of the electronic device (e.g., the electronic device 300 in FIG. 3A) to be spaced apart from the antenna structure 1500, and electrically connects to the PCB 1590 through an electrical connection member (e.g., a flexible PCB (FPCB) connector).

According to various embodiments, the antenna structure 1500 may be disposed in the inner space of the electronic device (e.g., the electronic device 300 in FIG. 3A) to form a beam pattern in a third direction (denoted by (3)) perpendicular to the first direction (denoted by (1)) through the first antenna array AR1. According to an embodiment, the third direction ((3)) may be a direction in which the lateral surface (e.g., the lateral surface 310C in FIG. 3A) of the electronic device (e.g., the electronic device 300 in FIG. 3A) faces. According to an embodiment, the antenna structure 1500 may be disposed in the inner space of the electronic device (e.g., the electronic device 300 in FIG. 3A) to form a beam pattern in the first direction ((1)) through the second antenna array AR2. According to an embodiment, the first direction ((1)) may be a direction in which the rear surface (e.g., the rear surface 310B in FIG. 3B) of the electronic device (e.g., the electronic device 300 in FIG. 3B) faces. According to an embodiment, the wireless communication circuit 1595 may be configured to transmit and/or receive a radio signal in a frequency range of about 3 GHz to about 100 GHz through the first antenna array AR1 and/or the second antenna array AR2.

Although the FIG. 25 embodiment describes and shows the antenna structure 1500 that includes the first antenna array AR1 composed of four conductive patterns 1510, 1520, 1530, and 1540 and the second antenna array AR2 composed of four conductive patches 1550, 1560, 1570, and 1580, this is exemplary only and not to be construed as a limitation. In various alternative embodiments, the antenna structure 1500 may include, as the first antenna array AR1, three, five, or more conductive patterns, and also include, as the second antenna array AR2, one, two, three, five, or more conductive patches.

According to various embodiments, the antenna structure 1500 may be disposed such that the PCB 590 is supported at least in part through the dielectric structures 660, 670, 680, 690, and 2410. According to various embodiments, the dielectric structure (e.g., the dielectric structure 660 in FIG. 7, 670 in FIG. 9, 680 in FIG. 11, 690 in FIG. 13, or 2410 in FIG. 24) may include areas having different dielectric constants at least in part, and may provide a propagation induction path resulting from a difference in the dielectric constant, thereby contributing to improving the radiation performance of the antenna.

According to various embodiments of the disclosure, inducing a beam pattern direction to a desired radiation direction by using the dielectric structure disposed in the electronic device can increase the antenna gain, expand the beam coverage, and thereby improve the radiation performance.

According to various embodiments, an electronic device (e.g., the electronic device 600 in FIG. 6) may include a housing (e.g., the housing 610 in FIG. 6) including a first cover (e.g., the rear cover 640 in FIG. 6) having a first dielectric constant, and an antenna structure (e.g., the antenna structure 500 in FIG. 6) disposed in an inner space (e.g., the inner space 6001) of the housing. The antenna structure may include a printed circuit board (PCB) (e.g., the PCB 590 in FIG. 6), at least one antenna element (e.g., the conductive pattern 510 in FIG. 6) disposed in the PCB to form a beam pattern in a specific direction, a first dielectric structure (e.g., the dielectric structure 660 in FIG. 7) disposed on a radiation path of the beam pattern, formed integrally with or combined with the PCB, and having a second dielectric constant equal to or different from the first dielectric constant, and a second dielectric structure (e.g., the high-dielectric injected portion 671 in FIG. 11) disposed on the radiation path between the first dielectric structure and the first cover, and having a third dielectric constant higher than the first dielectric constant and the second dielectric constant. The electronic device may further include a wireless communication circuit (e.g., the wireless communication circuit 595 in FIG. 5) configured to transmit and/or receive a radio signal through the at least one antenna element.

According to various embodiments, the second dielectric structure may include a high-dielectric injected portion injected into the first dielectric structure on the radiation path.

According to various embodiments, the third dielectric constant may be determined based on at least one of width (e.g., the width (w2) in FIG. 9), length (e.g., the length (l2) in FIG. 9), or thickness (e.g., the thickness (t) in FIG. 9) of the high-dielectric injected portion.

According to various embodiments, the high-dielectric injected portion may be disposed to have an upper surface that coincides with an upper surface (e.g., the upper surface 661 in FIG. 11) of the first dielectric structure.

According to various embodiments, the second dielectric structure may include a high-dielectric patch (e.g., the high-dielectric patch 691 in FIG. 13) attached to an upper surface of the first dielectric structure on the radiation path.

According to various embodiments, the PCB may be supported at least in part by the first dielectric structure.

According to various embodiments, the first dielectric structure may include a low-dielectric structure disposed on both sides of the second dielectric structure and having a fourth dielectric constant lower than the third dielectric constant.

According to various embodiments, the low-dielectric structure may be formed as a recess (e.g., the recesses 662 and 663 in FIG. 11) in the first dielectric structure.

According to various embodiments, the fourth dielectric constant may be determined based on at least one of width (e.g., the width (w1) in FIG. 7), length (e.g., the length (l1) in FIG. 7), or depth (e.g., the depth (h1) in FIG. 7) of the recess.

According to various embodiments, the low-dielectric structure may include periodic structures (e.g., the periodic structures 692 in FIG. 13) formed at a predetermined depth in the first dielectric structure.

According to various embodiments, the periodic structures may include air holes formed at a predetermined depth in the first dielectric structure.

According to various embodiments, the periodic structures may include a filling material filled in the air holes and having a dielectric constant lower than the second dielectric constant.

According to various embodiments, the fourth dielectric constant may be determined based on at least one of a distance between the periodic structures, a size of each periodic structure, a number of arrangements of the periodic structures, or an arrangement density of the periodic structures.

According to various embodiments, the electronic device may further include a second cover (e.g., the front cover 630 in FIG. 6) facing in a direction opposite to the first cover, and a display (e.g., the display 631 in FIG. 6) disposed in the inner space to be visible at least in part from outside through the second cover.

According to various embodiments, an electronic device (e.g., the electronic device 600 in FIG. 6) may include a housing (e.g., the housing 610 in FIG. 6) and an antenna structure (e.g., the antenna structure 500 in FIG. 6) disposed in an inner space (e.g., the inner space 6001) of the housing. The antenna structure may include a printed circuit board (PCB) (e.g., the PCB 590 in FIG. 6), at least one antenna element (e.g., the conductive pattern 510 in FIG. 6) disposed in the PCB to form a beam pattern in a specific direction, and a dielectric structure (e.g., the dielectric structure 660 in FIG. 7) disposed on a radiation path of the beam pattern, formed integrally with or combined with the PCB, and having a first dielectric constant, wherein the dielectric structure includes a first area (e.g., the first area A1 in FIG. 7) corresponding to the radiation path, and a low-dielectric structure (e.g., the recesses 662 and 663 in FIG. 7) disposed on both sides of the first area and having a second dielectric constant lower than the first dielectric constant. The electronic device may further include a wireless communication circuit (e.g., the wireless communication circuit 595 in FIG. 5) configured to transmit and/or receive a radio signal through the at least one antenna element.

According to various embodiments, the low-dielectric structure may include a recess formed to be lower than an upper surface of the dielectric structure.

According to various embodiments, the second dielectric constant may be determined based on at least one of width, length, or depth of the recess.

According to various embodiments, the low-dielectric structure may include periodic structures formed at a predetermined depth from an upper surface of the dielectric structure.

According to various embodiments, the second dielectric constant may be determined based on at least one of a distance between the periodic structures, a size of each periodic structure, a number of arrangements of the periodic structures, or an arrangement density of the periodic structures.

According to various embodiments, the housing may include a cover, and the electronic device may further include a high-dielectric structure disposed on the radiation path between the dielectric structure and the cover, and having a third dielectric constant higher than the first dielectric constant and a dielectric constant of the cover.

While the disclosure has been particularly shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a housing comprising a first cover facing a first direction, a second cover facing a second direction opposite to the first cover and lateral member surrounding an inner space between the first cover and the second cover, and the first cover having a first dielectric constant; and an antenna structure disposed in the inner space of the housing and comprising:

a printed circuit board (PCB);

at least one antenna element disposed in the PCB to form a beam pattern in a third direction facing the lateral member and being perpendicular to the first direction;

a first dielectric structure disposed on a radiation path of the beam pattern, formed integrally with or combined with the PCB, and having a second dielectric constant, the first dielectric structure being spaced apart from the lateral member;

a second dielectric structure disposed on the radiation path between the first dielectric structure and the first cover, and having a third dielectric constant higher than the first dielectric constant and the second dielectric constant; and a wireless communication circuit configured to at least one of transmit or receive a radio signal through the at least one antenna element, wherein at least a part of the second dielectric structure is disposed between the PCB and the lateral member.

2. The electronic device of claim 1, wherein the second dielectric structure comprises a high-dielectric injected portion injected into the first dielectric structure on the radiation path.

3. The electronic device of claim 2, wherein the third dielectric constant is determined based on at least one of a width, a length, or a thickness of the high-dielectric injected portion.

4. The electronic device of claim 2, wherein the high-dielectric injected portion is disposed to have an upper surface that coincides with an upper surface of the first dielectric structure.

5. The electronic device of claim 1, wherein the second dielectric structure comprises a high-dielectric patch attached to an upper surface of the first dielectric structure on the radiation path.

6. The electronic device of claim 1, wherein the PCB is supported at least in part by the first dielectric structure.

7. The electronic device of claim 1, wherein the first dielectric structure comprises a low-dielectric structure disposed on both sides of the second dielectric structure, and wherein the low-dielectric structure has a fourth dielectric constant lower than the third dielectric constant.

8. The electronic device of claim 7, wherein the low-dielectric structure is formed as a recess in the first dielectric structure.

9. The electronic device of claim 8, wherein the fourth dielectric constant is determined based on at least one of a width, a length, or a depth of the recess.

10. The electronic device of claim 7, wherein the low-dielectric structure comprises periodic structures formed at a predetermined depth in the first dielectric structure.

11. The electronic device of claim 10, wherein the periodic structures comprise air holes formed at the predetermined depth in the first dielectric structure.

12. The electronic device of claim 11, wherein the periodic structures comprise a filling material filled in the air holes, and wherein the filling material has a dielectric constant lower than the second dielectric constant.

13. The electronic device of claim 10, wherein the fourth dielectric constant is determined based on at least one of a distance between the periodic structures, a size of each periodic structure, a number of arrangements of the periodic structures, or an arrangement density of the periodic structures.

14. The electronic device of claim 1, further comprising:

a display disposed in the inner space to be visible at least in part from outside through the second cover.

15. An electronic device comprising:

a housing comprising a first cover facing a first direction, a second cover facing a second direction opposite to the first cover and lateral member surrounding an inner space between the first cover and the second cover, and the first cover having a first dielectric constant; and an antenna structure disposed in the inner space of the housing and comprising:

a printed circuit board (PCB);

at least one antenna element disposed in the PCB to form a beam pattern in a third direction facing the lateral member and being perpendicular to the first direction; and a dielectric structure disposed on a radiation path of the beam pattern, formed integrally with or combined with the PCB, the dielectric structure being spaced apart from the lateral member, the dielectric structure comprising:

a first area corresponding to the radiation path, and having the first dielectric constant, and a second area including a low-dielectric structure disposed on both sides of the first area and having a second dielectric constant lower than the first dielectric constant; and a wireless communication circuit configured to at least one of transmit or receive a radio signal through the at least one antenna element, wherein at least a part of the first area is disposed between the PCB and the lateral member.

16. The electronic device of claim 15, wherein the low-dielectric structure comprises a recess formed to be lower than an upper surface of the dielectric structure.

17. The electronic device of claim 16, wherein the second dielectric constant is determined based on at least one of a width, a length, or a depth of the recess.

18. The electronic device of claim 15, wherein the low-dielectric structure comprises periodic structures formed at a predetermined depth from an upper surface of the dielectric structure.

19. The electronic device of claim 18, wherein the second dielectric constant is determined based on at least one of a distance between the periodic structures, a size of each periodic structure, a number of arrangements of the periodic structures, or an arrangement density of the periodic structures.

20. The electronic device of claim 15, wherein the electronic device further comprises a high-dielectric structure disposed on the radiation path between the dielectric structure and the first cover, and wherein the high-dielectric structure has a third dielectric constant higher than the first dielectric constant and a dielectric constant of the first cover.

* * * * *